(12) United States Patent
Kimura et al.

(10) Patent No.: US 7,304,782 B2
(45) Date of Patent: Dec. 4, 2007

(54) DRIVING METHOD OF SPATIAL LIGHT MODULATOR ARRAY, SPATIAL LIGHT MODULATOR ARRAY, AND IMAGE FORMING APPARATUS

(75) Inventors: Koichi Kimura, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 146 days.

(21) Appl. No.: 11/087,642

(22) Filed: Mar. 24, 2005

(65) Prior Publication Data

US 2005/0219676 A1 Oct. 6, 2005

(30) Foreign Application Priority Data

Mar. 24, 2004 (JP) ............... P.2004-086163

(51) Int. Cl.
G02B 26/00 (2006.01)
(52) U.S. Cl. ............. 359/290; 359/291; 359/292; 359/295; 359/298; 359/318
(58) Field of Classification Search ......... 359/223, 359/224, 290–292, 295, 298, 318
See application file for complete search history.

(56) References Cited

U.S. PATENT DOCUMENTS 5,212,582 A * 5/1993 Nelson ............ 359/224
6,985,278 B2 * 1/2006 Chu et al. ............ 359/291

FOREIGN PATENT DOCUMENTS

| JP | 6-124341 A | 5/1994 |
|----|------------|--------|
| JP | 8-334709 A | 12/1996 |
| JP | 9-238106 | 9/1997 |

* cited by examiner

*Primary Examiner*—Evelyn A. Lester
(74) *Attorney, Agent, or Firm*—Sughrue Mion Pllc.

(57) ABSTRACT

A driving method of a spatial light modulator array having plural spatial light modulators of micro-electro-mechanical system, the plural spatial light modulators each including: a movable part supported to be capable of being elastically displaced and provided with a movable electrode; and a fixed electrode disposed to face the movable part, wherein in a case where the voltages are applied to the electrodes and the movable part is driven and displaced in a fixed electrode direction, an absolute value of an inter-electrode voltage between the movable electrode and the fixed electrode is decreased while the movable part is transitioning in a direction of the fixed electrode.

16 Claims, 24 Drawing Sheets

NEXT DISPLACEMENT DATA

NEXT DISPLACEMENT DATA

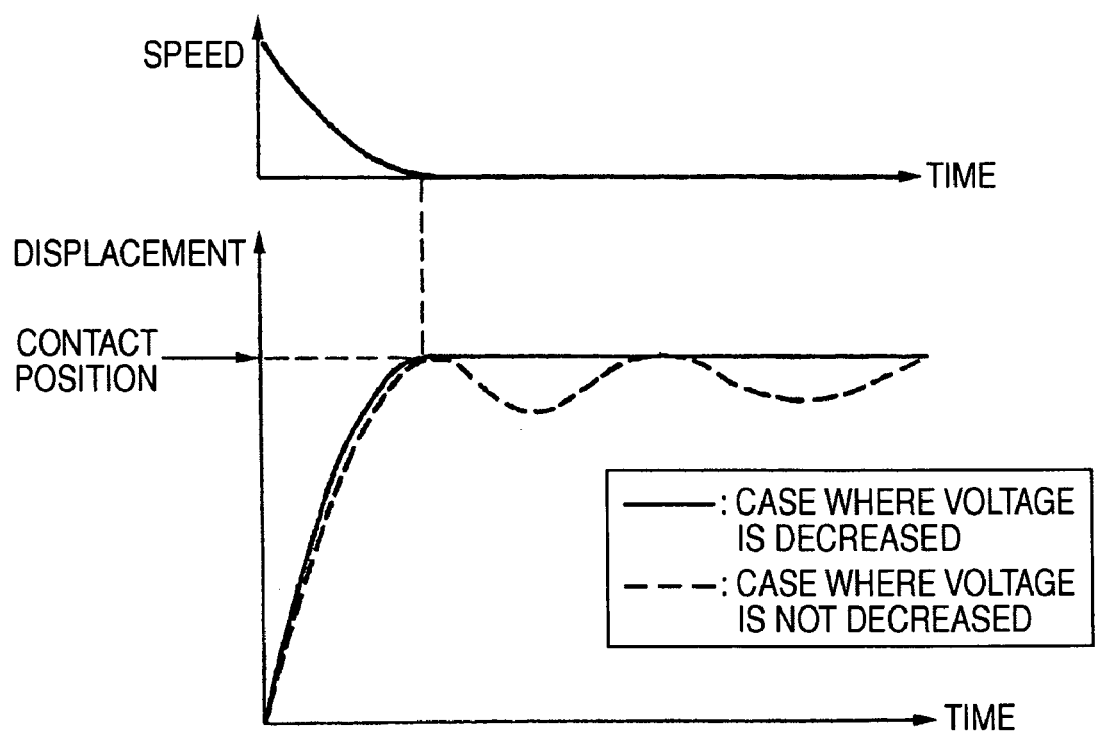

☐ : PERIOD IN WHICH MOVABLE PARTS TRANSITION IN SAME STATE TO FIXED ELECTRODE

☐ : PERIOD IN WHICH MOVABLE PARTS TRANSITION IN SAME STATE TO FIXED ELECTRODE

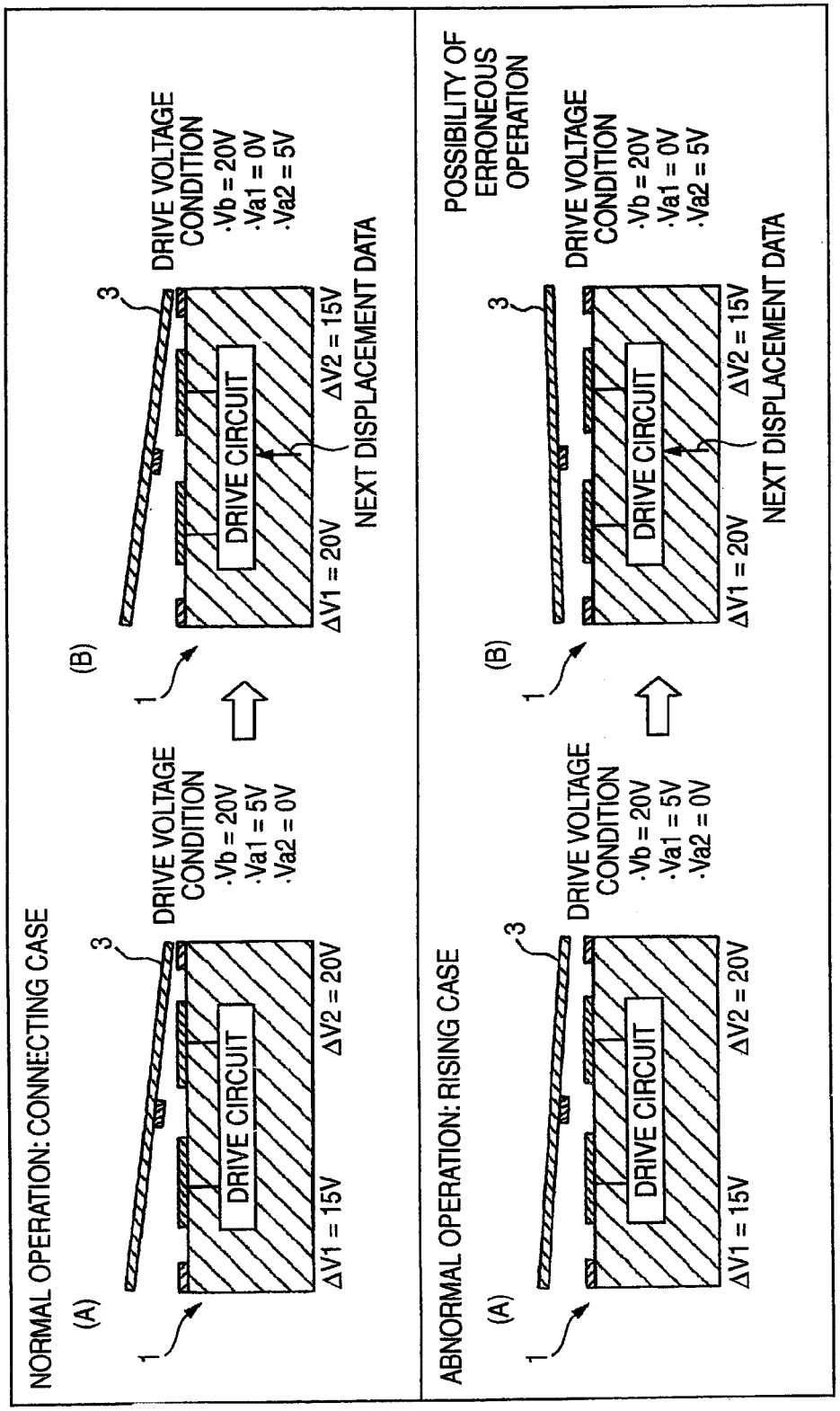

US 7,304,782 B2

DRIVING METHOD OF SPATIAL LIGHT MODULATOR ARRAY, SPATIAL LIGHT MODULATOR ARRAY, AND IMAGE FORMING APPARATUS

This application is based on Japanese Patent application JP 2004-086163, filed Mar. 24, 2004, the entire content of which is hereby incorporated by reference. This claim for priority benefit is being filed concurrently with the filing of this application.

BACKGROUND OF THE INVENTION

1. Technical Field of the Invention

The present invention relates to a driving method of a spatial light modulator array for modulating incident light by displacing a micromirror, to the spatial light modulator array and to an image forming apparatus.

2. Description of the Related Art

In recent years, attention is paid to, as one of spatial light modulators (SLM), a digital micromirror device (DMD) in which a micromirror is formed on the basis of micromechanics technology and the micromirror is tilted to deflect light. The DMD is used for various purposes in the field of optical information processing, such as a projection display, a video monitor, a graphic monitor, a television and an electrophotographic print. Techniques relating to the DMD are disclosed in following patent documents JP-A-6-124341, JP-A-8-334709, and JP-A-9-238106 and the like filed by Texas Instruments Incorporated and open to the public.

In the DMD, plural micromirrors each having a size of about 16 μm×16 μm are provided at a pitch of 17 μm on a CMOS SRAM formed on a silicon substrate, and each of the micromirrors corresponds to a pixel of a screen. FIG. 27 is an exploded perspective view showing one spatial light modulator (pixel) 1 of a spatial light modulator array. A micromirror 3 is connected to a support post connection part 9 of a yoke 7 by a micromirror support post 5. The yoke 7 is held by a hinge 11.

Besides, the hinge 11 is held by a post cap 13. The post cap 13 is connected to a hinge support post connection part 19 of a common bus 17 by a hinge support post 15.

That is, the micromirror 3 is connected to the common bus 17 through the hinge 11, the post cap 13 and the hinge support post 15. A common voltage is supplied to the micromirror 3 through the common bus 17. The common bus 17 includes a landing site 21 as a stop member. The landing site 21 has insulating properties or is kept at the same potential as the micromirror 3.

Reference numeral 23a denotes one fixed electrode (first address electrode), and 23b denotes the other fixed electrode (second address electrode). The first address electrode 23a is connected to an electrode support post connection part 29 of a first address electrode pad 27a by an electrode support post 25. Besides, the second address electrode 23b is also connected to an electrode support post connection part 29 of a second address electrode pad 27b by an electrode support post 25.

A digital signal inputted from a first connection part 31a to the first address electrode pad 27a is inputted to the first address electrode 23a. A digital signal inputted from a second connection part 31b to the second address electrode pad 27b is inputted to the second address electrode 23b. The digital signals are inputted to the first address electrode 23a and the second address electrode 23b, so that the micromirror 3 is tilted, and a white display or a black display is selected. When the micromirror 3 is tilted, a part of a yoke piece 33 may come in contact with the landing site 21.

Next, the drive sequence of the spatial light modulator constructed as described above will be described.

FIG. 28 is a sectional view schematically showing the spatial light modulator shown in FIG. 27, and FIG. 29 is an explanatory view of the drive sequence of the spatial light modulator shown in FIG. 28.

In the spatial light modulator 1, the micromirror 3 is tilted to, for example, the left (the left in FIG. 28) in an initial state. At this time, as shown in FIG. 29, a given common voltage Vb is applied to the common bus 17(a). On the other hand, an address voltage Va1 applied to the first address electrode 23a is set to be smaller than an address voltage Va2 applied to the second address electrode 23b (Va1<Va2). Accordingly, a potential difference (|Vb−Va1|) at the left side of the micromirror 3 is larger than a potential difference (|Vb−Va2|) at the right side, and the micromirror is tilted to the left by an electrostatic force.

In the drive sequence to cause the micromirror 3 to transition to, for example, the right tilt state from this state, first, the voltages applied to the first address electrode 23a and the second address electrode 23b are inverted (Va1>Va2). Even if the voltages applied to the address electrodes are inverted as stated above, the micromirror 3 keeps the left tilt. This is because the right end of the micromirror 3 and the second address electrode 23b are sufficiently separate from each other, so that the electrostatic force to cause tilting is not exerted. By this operation, a so-called latch function is realized in which next writing Tw shown in FIG. 29 is efficiently enabled, while the tilting state (displaying state) is kept.

Next, the address voltages to the first address electrode 23a and the second address electrode 23b are kept as they are, and as shown in FIG. 29, only the common voltage Vb is lowered (b). Then, the electrostatic force at the left side of the micromirror 3 disappears, a slight electrostatic force is exerted at the right side, the elastic restoring force of the hinge 11 is added thereto, the left side of the micromirror 3 rises, and there occurs a state in which the holding of the left tilting is released.

Next, when the common voltage Vb is returned to the given value (c), the electrostatic force at the right side of the micromirror 3 is exerted strongly, and the micromirror 3 transitions to the right tilt state. When the micromirror 3 transitions to the right tilt state, the distance to the second address electrode 23b becomes short, so that the electrostatic force becomes relatively large, and the micromirror is now kept in a state in which the right side lands on the landing site 21. A time from the decrease of the common voltage Vb to the landing of the right side of the micromirror 3 is a switch time Tr shown in FIG. 29.

Here, the micromirror 3 receives a reaction force from the landing site 21 immediately after its right lands, so that vibration occurs. Thus, next writing (d) is performed after the switch time Tr passes and further, after a vibration damping time Ts passes. The time (Td=Tr+Ts) from the decrease of the common voltage Vb to the next writing is an intrinsic time depending on the spatial light modulator 1. Besides, in FIG. 29, Tb denotes a time from the end of the former writing to the start of the next writing. Accordingly, in the conventional driving method of the spatial light modulator array, as shown in FIG. 30, the total time (drive cycle) Tc=Tw+Tb of the writing time Tw and the time Tb from the end of the former writing to the start of the next writing is repeated, so that writing of one block (one row) BL[1] is performed, and this is performed for a specified number (M) of blocks (plural rows) BL [M], so that the display of all pixels is performed.

In the case where the foregoing spatial light modulator 1 is used to perform photosensitive material exposure at high speed, or in the case where a projector with a higher pixel number is desired to carry out a display, it is necessary to speed up the drive cycle Tc. Here, in order to speed up the drive cycle Tc, it is conceivable to shorten Tw (writing time) and to shorten Tb (time from the end of the former writing to the start of the next writing). For the shortening of Tw, from the relation of Tw=(the number of all pixels)/(writing clock frequency), reduction in the number of all pixels or speed-up of a writing clock frequency becomes effective means. However, the former is contrary to the demand for a high pixel number, and the latter depends on a clock device development technique. On the other hand, the shortening of Tb can be achieved, as shown in FIG. 31, by performing the writing during Ts (vibration damping time) (see a broken line part of displacement in FIG. 31).

However, when the writing is performed in the vibration damping time Ts (when the address voltage is inverted), there is a fear that an erroneous operation occurs according to the vibration state. FIG. 32 is an explanatory view showing a case (1) in which a normal operation occurs when the writing is performed in the vibration damping time, and a case (2) in which an erroneous operation occurs. That is, as shown in FIG. 32(1), even in the vibration damping time, in the case where for example, the right side of the micromirror 3 is in contact, even if the address voltages are inverted so that the inter-electrode voltages $\Delta V1=15$ V and $\Delta V2=20$ V of FIG. 32(1)A) become the inter-electrode voltages $\Delta V1=20$ V and $\Delta V2=15$ V of FIG. 32(1)B), the micromirror 3 keeps the right tilt. On the other hand, as shown in FIG. 32(2), in the vibration damping time, in the case where for example, the right side of the micromirror 3 is slightly separate from the landing site 21 due to vibration, when the address voltages are inverted so that the inter-electrode voltages $\Delta V1=15$ V and $\Delta V2=20$ V of FIG. 32(2)A become the inter-electrode voltages $\Delta V1=20$ V and $\Delta V2=15$ V of FIG. 32(2)B), since the right side of the micromirror 3 floats, the right electrostatic force becomes low, and the right electrostatic force becomes lower than the left electrostatic force at the time of the inversion of the address voltages, and as a result, there occurs an erroneous operation that the micromirror 3, which must be kept in the right tilt, is tilted to the left.

The invention has been made in view of the above circumstances.

SUMMARY OF THE INVENTION

An object of the invention is to provide a driving method of a spatial light modulator array in which writing of an address voltage is enabled without causing an erroneous operation even in a vibration damping time, the spatial light modulator array and an image forming apparatus, and to achieve shortening of a drive cycle.

The foregoing object of the invention can be achieved by the following constructions.

(1) A driving method of a spatial light modulator array including plural arranged spatial light modulators of micro-electro-mechanical system, each of which includes a movable part supported to be capable of being elastically displaced and provided with a movable electrode at at least apart, and a fixed electrode disposed to face the movable part, and in each of which the movable part is displaced by an electrostatic force generated according to voltages applied to the movable electrode and the fixed electrode, and light incident on the movable part is modulated, and is characterized in that in a case where the voltages are applied to the electrodes and the movable part is driven and displaced in a specified fixed electrode direction, an absolute value of an inter-electrode voltage between the movable electrode and the fixed electrode is decreased while the movable part is transitioning in the fixed electrode direction.

In this driving method of the spatial light modulator array, the voltages are applied to the electrodes, the absolute value of the inter-electrode voltage between the movable electrode and the fixed electrode is decreased while the movable part is transitioning in the fixed electrode direction before the movable part reaches a final displacement position, and the speed immediately before the movable part reaches the final displacement position is reduced. By this, it becomes possible to suppress vibration due to collision, which occurs in the related art since the movable part reaches the final displacement position at high speed, and vibration at a time when the movable part reaches the final displacement position in a case of non-contact driving. Accordingly, the structure remains similar to the related art one, and the vibration damping time is eliminated or is greatly shortened (in other words, the writing timing of data can be shifted to a slightly earlier one), and it is not necessary to wait until the vibration is damped contrary to the related art, and an address voltage can be written without causing an erroneous operation.

(2) The driving method of a spatial light modulator array including plural arranged spatial light modulators of micro-electro-mechanical system, each of which includes a movable part supported to be capable of being elastically displaced and provided with a movable electrode at at least a part, and a fixed electrode disposed to face the movable part, and in each of which the movable part is displaced by an electrostatic force generated according to voltages applied to the movable electrode and the fixed electrode, and light incident on the movable part is modulated, and is characterized in that in a case where the voltages are applied to the electrodes and the movable part is driven and displaced in a specified fixed electrode direction, an absolute value of an inter-electrode voltage between the movable electrode and the fixed electrode is increased while the movable part is transitioning in an opposite direction to the fixed electrode.

According to this driving method of the spatial light modulator array, the absolute value of the inter-electrode voltage between the movable electrode and the fixed electrode is increased while the movable part is transitioning in the opposite direction to the fixed electrode, and the movable part is pulled back to the fixed electrode as the final displacement position. By this, it becomes possible to suppress the vibration occurring in the movable part in the related art. Accordingly, the structure remains similar to the related art one, and the vibration damping time is eliminated or is greatly shortened, and it is not necessary to wait until the vibration is damped contrary to the related art, and the address voltage can be written without causing an erroneous operation.

(3) A driving method of a spatial light modulator array including plural arranged spatial light modulators of micro-electro-mechanical system, each of which includes a movable part supported to be capable of being elastically displaced and provided with a movable electrode at at least a part, and a fixed electrode disposed to face the movable part, and in each of which the movable part is displaced by an electrostatic force generated according to voltages applied to the movable electrode and the fixed electrode, and light incident on the movable part is modulated, and is characterized in that in a case where the voltages are applied to the electrodes and the movable part is driven and displaced in a specified fixed electrode direction, an absolute value of an inter-electrode voltage between the movable electrode and the fixed electrode is decreased while the movable part is transitioning in the fixed electrode direction, and the absolute value of the inter-electrode voltage between the movable electrode and the fixed electrode is increased while the movable part is transitioning in an opposite direction to the fixed electrode.

According to this driving method of the spatial light modulator array, the voltages are applied to the electrodes, the absolute value of the inter-electrode voltage between the movable electrode and the fixed electrode is decreased while the movable part is transitioning in the fixed electrode direction before the movable part reaches a final displacement position, and the speed immediately before the movable part reaches the final displacement position is reduced. By this, it becomes possible to suppress vibration due to collision, which occurs in the related art since the movable part reaches the final displacement position at high speed, or vibration at a time when the movable part reaches the final displacement position in a case of non-contact driving. Besides, the absolute value of the inter-electrode voltage between the movable electrode and the fixed electrode is increased while the movable part is transitioning in the opposite direction to the fixed electrode, and the movable part is pulled back to the fixed electrode as the final displacement position. By this, the movable part is pulled back to the fixed electrode as the final displacement position, and it becomes possible to suppress the vibration occurring in the movable part in the related art. Accordingly, the structure remains similar to the conventional one, and the vibration damping time is eliminated or is greatly shortened. Thus, it is not necessary to wait until the vibration is damped contrary to the related art, and the address voltage can be written without causing an erroneous operation.

(4) The driving method of a spatial light modulator array according to any one of (1) to (3), wherein the speed of the movable part at an instant when the movable part reaches the final displacement position is made substantially zero.

According to this driving method of the spatial light modulator, the speed at the instant when the movable part reaches the final displacement position becomes substantially zero, and there does not occur vibration due to collision, which occurs in the related art since the movable part reaches the final displacement position at high speed, or vibration at the time when the movable part reaches the final displacement position in a case of non-contact driving.

(5) The driving method of a spatial light modulator according to any one of (1) to (3), wherein a final displacement position is one of a first position where the spatial light modulator is brought into a light outgoing state and a second position where the spatial light modulator is brought into a light non-outgoing state, and the inter-electrode voltage between the movable electrode and the fixed electrode is controlled so that timings when the movable parts transition from the final displacement position of one of the first position and the second position to the final displacement position of one of the first position and the second position become substantially coincident with each other.

According to this driving method of the spatial light modulator array, in the spatial light modulator array in which the plural spatial light modulators are arranged, the inter-electrode voltage between the movable electrode and the fixed electrode is controlled, so that the timings of the movable parts of the respective spatial light modulators, which transition from the first position to the second position, from the second position to the first position, from the first position to the first position (or from the second position to the second position), are substantially coincident with each other. That is, the inter-electrode voltage is controlled, so that the respective movable parts reach the final displacement positions substantially at the same time. By this, in the spatial light modulator array in which the plural spatial light modulators are arranged, the arrival timings to the final displacement positions are synchronized, and the decrease processing, the increase processing, and the increase/decrease processing of the inter-electrode voltage for suppressing the vibration, as the operations according to the first to third aspects, become possible by the shared voltage (common voltage) control. That is, the vibration suppression effect of the plural pixels can be realized by the common voltage control.

(6) The driving method of a spatial light modulator according to any one of (1) to (3), wherein a final displacement position is one of a first position where the spatial light modulator is brought into a light outgoing state and a second position where the spatial light modulator is brought into a light non-outgoing state, and when timings when the movable parts transition from the final displacement position of one of the first position and the second position to the final displacement position of one of the first position and the second position are substantially coincident with each other, the absolute value of the inter-electrode voltage between the movable electrode and the fixed electrode is increased, and then, the absolute value of the inter-electrode voltage between the movable electrode and the fixed electrode is decreased.

According to this driving method of the spatial light modulator array, in the spatial light modulator array in which the plural spatial light modulators are arranged, vibration waveforms of the spatial light modulators are measured, and the timing when the movable parts of the respective spatial light modulators become naturally coincident with each other and transition to the final displacement positions is previously set, and the inter-electrode voltage is increased at the timing. Accordingly, the decrease processing, the increase processing, and the increase/decrease processing of the inter-electrode voltage for suppressing the vibration, as the operations according to (1) to (3), become possible by the shared voltage (common voltage) control, and the vibration suppression effect of the plural pixels can be realized by the common voltage control.

(7) The driving method of a spatial light modulator according to anyone of (1) to (3), wherein the final displacement position is one of a first position where the spatial light modulator is brought into a light outgoing state and a second position where the spatial light modulator is brought into a light non-outgoing state, and when the movable parts transition from the final displacement position of one of the first position and the second position to the final displacement position of one of the first position and the second position, the voltage application according to (1) to (3) is carried out in a period in which the movable parts transition in same directions with respect to the fixed electrodes.

According to this driving method of the spatial light modulator, the common voltage control is performed in the period in which the movable parts transition in the same directions with respect to the fixed electrodes, so that the attenuation effect is obtained. That is, the common voltage is controlled in the process in which the movable parts move in the attraction direction, the process in which they move in the opposite direction to the attraction direction, or in both the processes, and a velocity immediately before the movable parts reach the final displacement position is attenuated, the movable parts are pulled back to the final displacement position, or the both effects are obtained. As stated above, since the period shaving same transition state are extracted, even in the spatial light modulator array in which the plural spatial light modulators are provided, the vibration attenuation effect by the operation can be obtained by the common voltage control.

(8) The driving method of a spatial light modulator array according to any one of (1) to (3), wherein each of the spatial light modulators includes a drive circuit including a memory circuit, one of the electrodes is a signal electrode to which an element displacement signal is inputted from the drive circuit, the other is a selection electrode to which a common voltage is inputted at a time of element driving, and the element displacement signal is inputted to the signal electrode after the movable part reaches the final displacement position.

According to this driving method of the spatial light modulator array, while a given common voltage similar to the related art is applied to the selection electrode, the element displacement signal is applied to the signal electrode, and the speed of the movable part is reduced immediately before it reaches the movable final displacement position, and after it is latched in a state where vibration does not occur, writing by the element signal is performed.

(9) The driving method of a spatial light modulator according to any one of (1) to (3), wherein the movable parts come in contact with stop members respectively disposed at their final displacement positions and are stopped.

According to this driving method of the spatial light modulator, in the so-called contact spatial light modulator array in which the movable part comes in contact, the vibration due to deformation, which occurs in the related art since the movable part reaches the final displacement position at high speed, and overshoot can be suppressed.

(10) A spatial light modulator array including plural arranged spatial light modulators of micro-electro-mechanical system, each of which includes a movable part supported to be capable of being elastically displaced and provided with a movable electrode at at least a part, and a fixed electrode disposed to face the movable part, and in each of which the movable part is displaced by an electrostatic force generated according to voltages applied to the movable electrode and the fixed electrode, and light incident on the movable part is modulated, and is characterized by including a control part for performing light modulation by driving the movable part based on the driving method of a spatial light modulator array according to any one of (1) to (9).

According to the spatial light modulator array, before the movable part reaches the final displacement position, the absolute value of the inter-electrode voltage between the movable electrode and the fixed electrode is decreased, increased or increased/decreased, and the vibration due to collision, which occurs in the related art by the arrival of the movable part to the final displacement position, and the overshoot can be suppressed. Accordingly, the structure remain similar to a conventional one, and the vibration damping time can be eliminated or greatly shortened, and the address voltage can be written without causing an erroneous operation.

(11) An image forming apparatus comprising an optical source, a spatial light modulator array according to (10), an illumination optical system for irradiating the spatial light modulator array with light from the light source, and a projection optical system for projecting light emitted from the spatial light modulator array onto an image formation surface.

In this image forming apparatus, since the spatial light modulator array according to (10) is provided as a main part of the structure, the vibration damping time is eliminated or greatly shortened, and the writing of the address signal becomes possible without causing the erroneous operation, and as compared with the related art apparatus, the drive cycle is shortened. By this, it becomes possible to realize high speed photosensitive material exposure and to cause a projector with a higher pixel number to carry out display. Besides, in the image forming apparatus (exposure apparatus) in which gradation control is performed by on/off of exposure light, since the on/off time can be shortened, higher gradation can be realized.

According to the driving method of the spatial light modulator array of the invention, in the case where the movable part is driven and displaced by applying the voltage to the electrode, before or after the movable part reaches the final displacement position, the absolute value of the inter-electrode voltage between the movable electrode and the fixed electrode is decreased, increased or increased/decreased, so that the vibration occurring due to the arrival of the movable part at the final displacement position can be suppressed. Accordingly, the vibration damping time can be eliminated or greatly shortened, it is not necessary to wait until the vibration is damped contrary to the related art, and the address voltage can be written without causing the erroneous operation. As a result, the drive cycle can be shortened.

According to the spatial light modulator array of the invention, since the control part for performing the optical modulation based on the driving method of the spatial light modulator array according to any one of (1) to (9) is provided, the vibration after the movable part reaches the final displacement position can be suppressed. Accordingly, the vibration damping time can be eliminated or greatly shortened, it is not necessary to wait until the vibration is damped contrary to the related art, and the address voltage can be written without causing the erroneous operation. As a result, the drive cycle can be shortened and the high speed display of all pixels can be performed.

According to the image forming apparatus of the invention, since the light source, the spatial light modulator array according to (10), the illumination optical system for irradiating the spatial light modulator array with light from the light source, and the projection optical system for projecting light emitted from the spatial light modulator array are provided, as compared with a related art apparatus, the drive cycle can be shortened. As a result, it is possible to realize high speed photosensitive material exposure and to cause a projector with a higher pixel number to carry out display.

BRIEF DESCRIPTION OF THE DRAWINGS

FIG. 6 is an operation explanatory view showing, by correlation of displacement and speed with time, the behavior of a movable part in the driving method of the invention.

FIG. 32 is an explanatory view of an erroneous operation occurring by the writing during the vibration damping time.

DETAILED DESCRIPTION OF THE INVENTION

Hereinafter, preferred embodiments of a driving method of a spatial light modulator array of the invention, the spatial light modulator array, and an image forming apparatus will be described with reference to the drawings.

Figure 1:
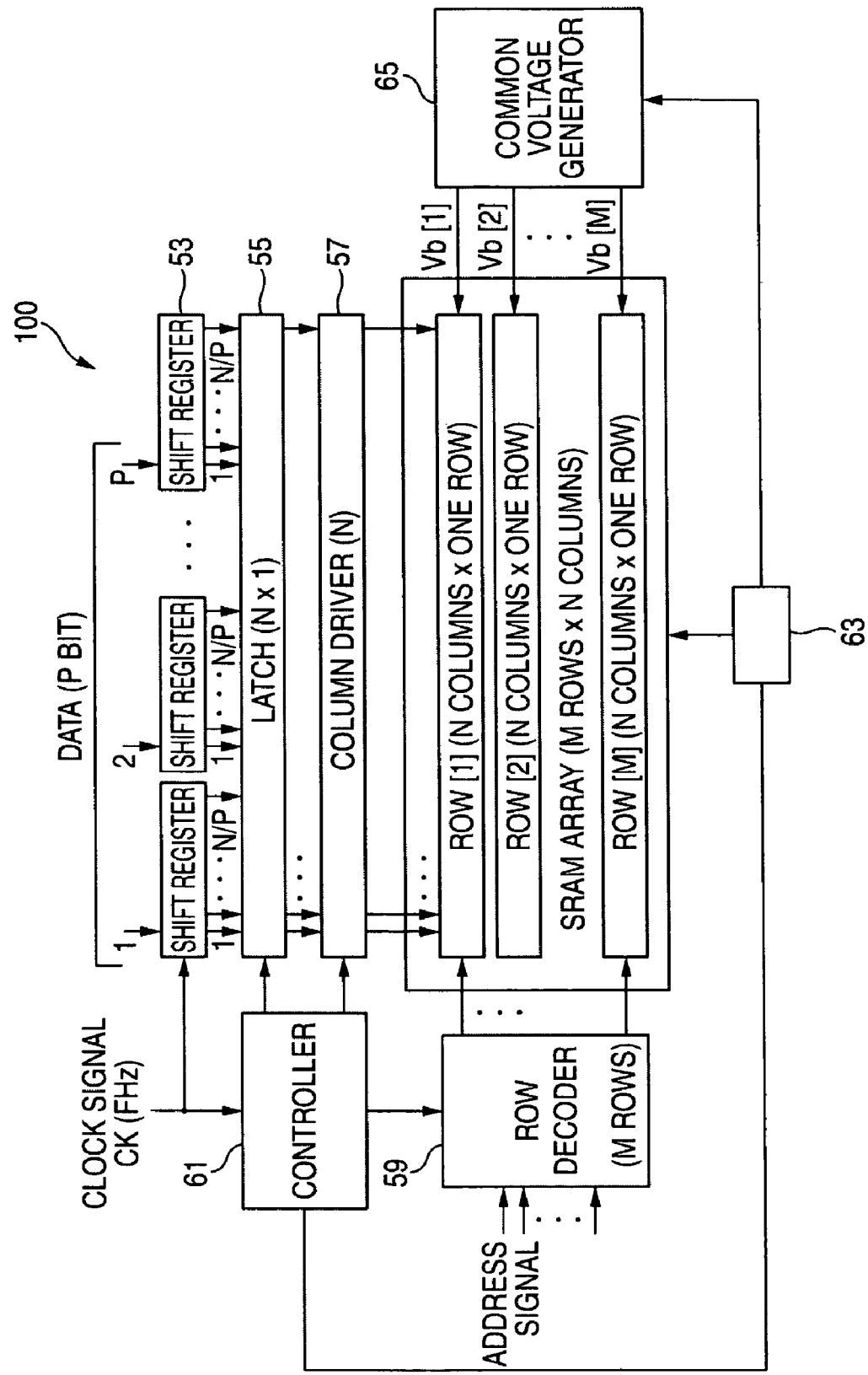
FIG. 1 is a view showing an embodiment of a spatial light modulator array used in a driving method of the invention and its peripheral memory loading circuit.
Figure 2:
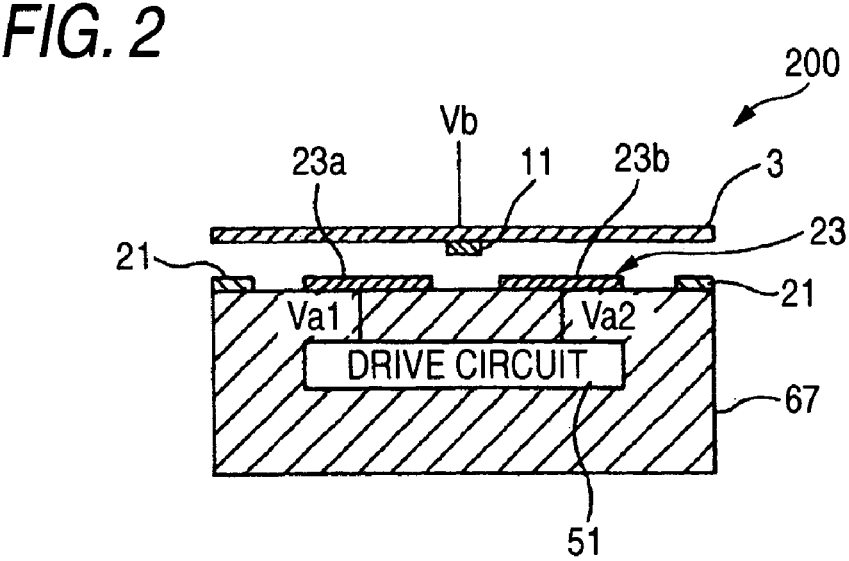
FIG. 2 is a sectional view schematically showing one spatial light modulator in the spatial light modulator array.
Figure 3:
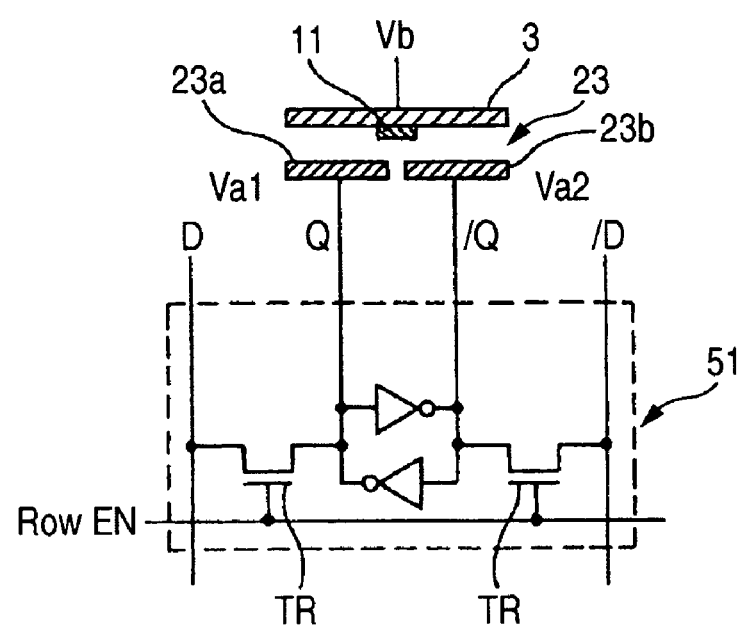
FIG. 3 is an equivalent circuit diagram of a drive circuit shown in FIG. 2.

FIG. 1 is a view showing an embodiment of a spatial light modulator array used for a driving method of the invention and its peripheral memory loading circuit, FIG. 2 is a sectional view schematically showing one spatial light modulator in the spatial light modulator array, and FIG. 3 is an equivalent circuit diagram of a drive circuit shown in FIG. 2.

A spatial light modulator array 100 includes a spatial light modulator 200 as shown in FIG. 2 which is individually addressable and is a micro-mechanical element. The spatial light modulator 200 is a deformable mirror device, and includes a movable part (micromirror 3) which is supported by a hinge 11 to be capable of being elastically displaced and is provided with a movable electrode at at least a part thereof. The micromirror 3 is displaced by a tilt movement. The spatial light modulator 200 is addressed by at least a pair of address electrodes as described later in detail, and stably displaces the micromirror 3 between a first position (left tilt position of FIG. 2) and a second position (right tilt position of FIG. 2) in common.

The spatial light modulator array 100 operates to cause light to be reflected at the micromirror 3 provided in each of the spatial light modulators 200. That is, each of the spatial light modulators 200 represents one pixel of an image. The spatial light modulator 200 is provided to be attached to a drive circuit 51 as a memory cell. The drive circuit 51 stores data relating to an on/off position.

A memory loading circuit shown in FIG. 1 corresponds to line loading in which the memory cell added with the spatial light modulator 200 is loaded in each row (line). Thus, the spatial light modulator array 100 includes 1 to P shift register circuits 53, a latch circuit 55, and a column driver circuit 57. The shift register circuit 53 is controlled by a clock signal CK.

Data of 1 to P columns are simultaneously written in the respective shift register circuits 53, and when data for 1 to N columns are written, the shift register circuits 53 are loaded, and the data row is transferred to the latch circuit 55. While the data are latched and are stored in the selected row of the spatial light modulator array 100, a next data row can be loaded into the shift register circuits 53. The latch circuit 55 is controlled by load, set and set signal. The column driver circuit 57 drives one bit of the row data to each of the columns.

A row decoder 59 is connected to the spatial light modulator array 100. The row decoder 59 receives address data expressing a row of 1 to M rows in which loading into memories is to be performed, a row enable signal and a read/write signal.

A controller 61 sends the load, the set and the set signal to the latch circuit 55, and sends the address data, the row enable signal, and the read/write signal to the row decoder 59. Besides, the controller 61 sends a drive signal to the column driver circuit 57.

The data row transferred to the latch circuit 55 is transferred to the column driver 57 as it is, its output is increased, and is supplied to data lines D and/D shown in FIG. 3. When the data row is supplied to the data line/D, a row designating signal to write the data row into a row by an address signal of FIG. 1 and the row decoder 59 is supplied to "Row EN" shown in FIG. 3.

When the row designating signal is supplied and the designated row becomes active, the drive circuits 51 including transistors TR are switched, and the written data row is memorized. These are repeated M times, so that the data of all pixels are written.

As shown in FIG. 2, the spatial light modulator 200 includes a fixed electrode 23 disposed to face the micromirror 3. This fixed electrode 23 includes a first address electrode 23a and a second address electrode 23b. The spatial light modulator 200 displaces the micromirror 3 by an electrostatic force generated by voltage application between the micromirror 3 and the fixed electrode 23, and modulates light incident on the micromirror 3. The spatial light modulator array 100 is formed such that the spatial light modulators 200 of micro-electro-mechanical system are arranged one-dimensionally or two-dimensionally. In this embodiment, one of the electrodes is the fixed electrode 23 to which element displacement signals Q and/Q (see FIG. 3) from the drive circuit 51 are written, and the other becomes the movable electrode to which a common voltage Vb is applied. This movable electrode is used also as the micromirror 3. Hereinafter, the micromirror 3 and the movable electrode 3 are denoted by the same character and are explained. Incidentally, in FIG. 2, reference numeral 21 denotes a landing site (pad) as a stop member; and 67 denotes a circuit board.

The drive sequence will be described in more specifically.

Figure 4A:
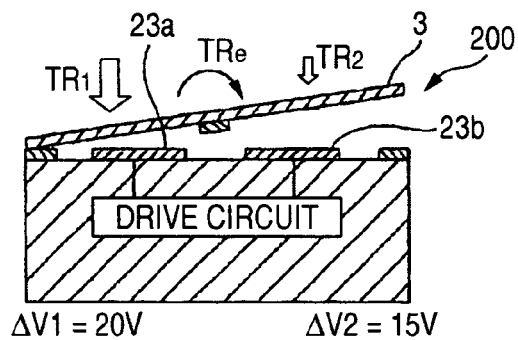
FIGS. 4A to 4E are explanatory views showing the behavior of a movable part in the driving method of the invention.
Figure 4D:
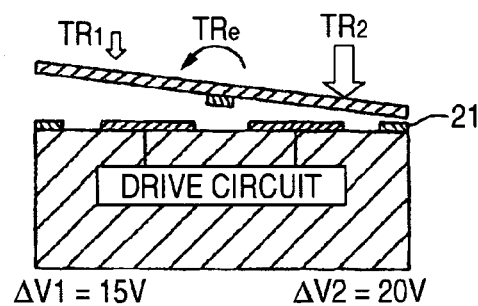
Figure 4B:
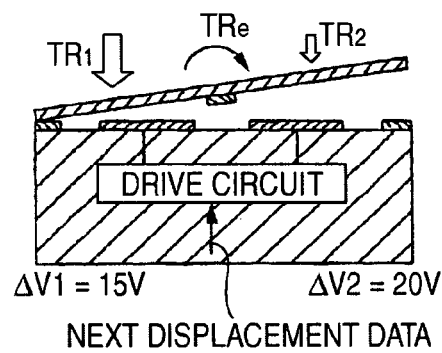
Figure 4E:
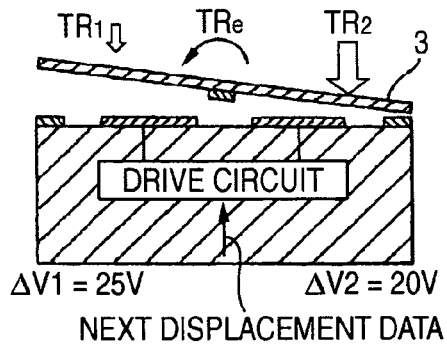
Figure 4C:
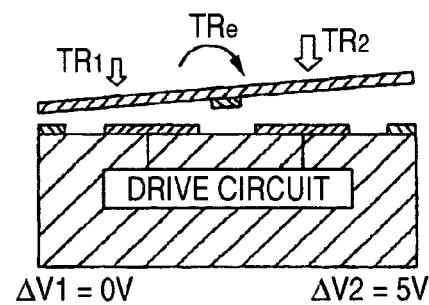
Figure 5:
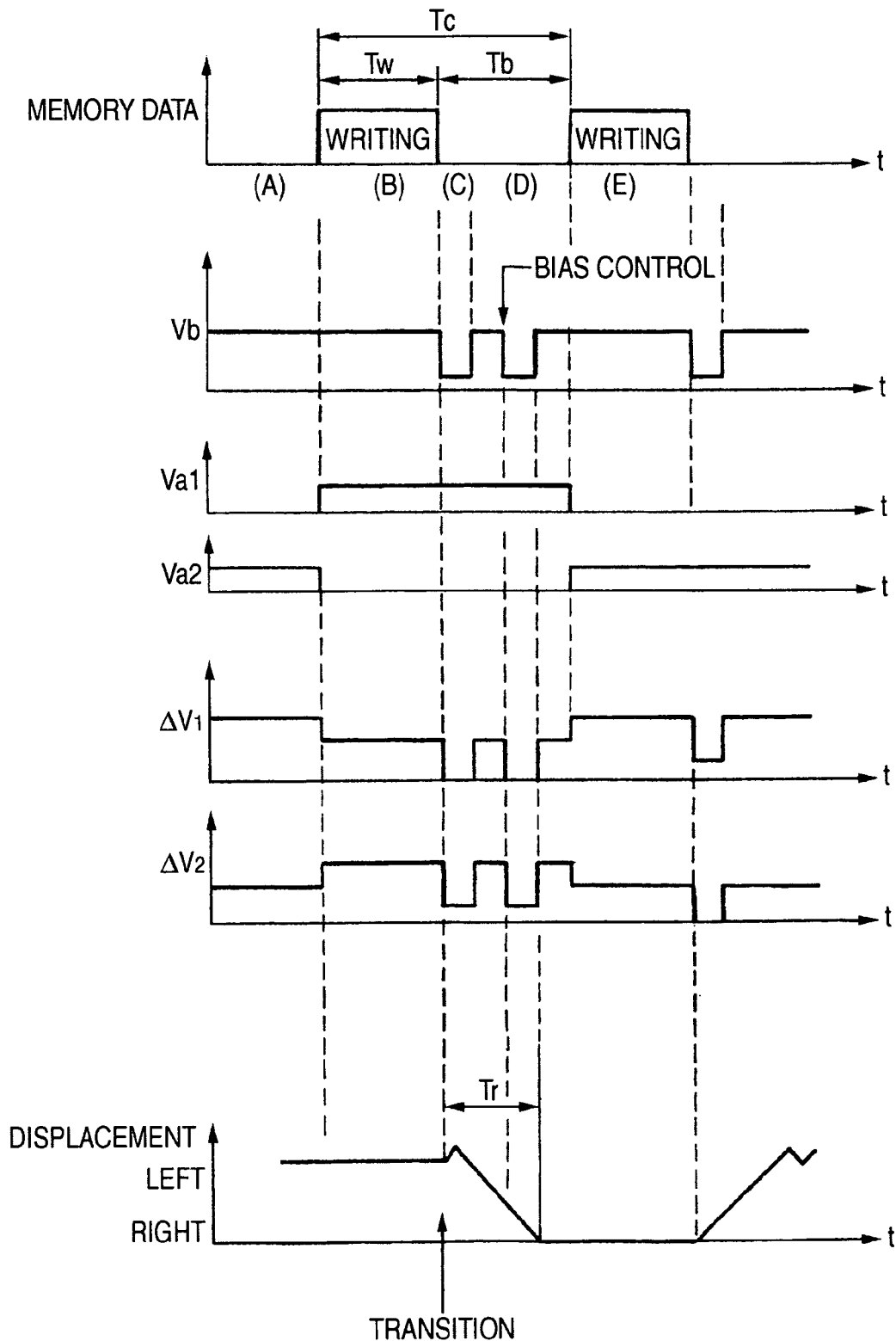
FIG. 5 is an explanatory view of a drive sequence of the driving method of the invention.

FIGS. 4A to 4E are explanatory views showing the behavior of the movable part in the driving method of the invention, and FIG. 5 is an explanatory view of the drive sequence of the driving method of the invention.

As shown in FIG. 4A, in the spatial light modulator 200, for example, the micromirror 3 is tilted to the left (left in FIGS. 4A to 4E) in the initial state. At this time, as shown in FIG. 5, a given common voltage Vb (+20 V) is applied to the movable electrode 3. On the other hand, an address voltage Va1 (0 V) applied to the first address electrode 23a is set to be smaller than an address voltage Va2 (+5 V) applied to the second address electrode 23b (Va1<Va2). Accordingly, an inter-electrode voltage (|Vb−Va1|=ΔV1=20 V) at the left side of the micromirror 3 becomes larger than an inter-electrode voltage (|Vb−Va2|=ΔV2=15 V) at the right side (ΔV1>ΔV2). By this, a counterclockwise electrostatic torque TR1 becomes larger than the sum of a clockwise electrostatic torque TR2 by the electrostatic force and an elastic restoring force Tre of the hinge 11, and the micromirror 3 is tilted to the left.

Next, as shown in FIG. 4B and FIG. 5, while the common voltage Vb remains as it is, the voltages applied to the first address electrode 23a and the second address electrode 23b are inverted (Va1>Va2). That is, the address voltage Va1 (5 V) is applied to the first address electrode 23a, and the address voltage Va2 (0 V) is applied to the second electrode 23b, and writing Tw of next displacement signals is performed. At this time, the inter-electrode voltages become (ΔV1=15 V)<(ΔV2=20 V), and the right side voltage becomes large, however, a latch state is kept by the foregoing action.

For example, in the drive sequence for causing the micromirror 3 to transition to the right tilt state from this state, first, the address voltages (Va1>Va2) to the first address electrode 23a and the second address electrode 23b are kept as they are, and as shown at a position denoted by character (C) in FIG. 5, only the common voltage Vb is lowered (for example, Vb=5 V). Then, the electrostatic force at the left side of the micromirror 3 disappears (ΔV1=0), a slight electrostatic force is exerted (ΔV2=5 V) at the right side, the elastic restoring force of the hinge 11 is added to this, and as shown in FIG. 4C, the left side of the micro mirror 3 rises, and there occurs a state in which the holding of the left tilt is released.

Next, as shown at a position denoted by character (D) in FIG. 5, after the common voltage Vb is returned to the original given value (Vb=20 V), the common control is performed in which the common voltage Vb is decreased (for example, Vb=5 V). That is, before the micromirror 3 reaches the right landing site 21 as the final displacement position, the absolute value of the inter-electrode voltage between the movable electrode 3 and the second address electrode 23b is decreased (ΔV2=5 V). By this, the speed immediately before the micromirror 3 reaches the landing site 21 is reduced.

Next, when the common voltage is returned to the original given value (Vb=20 V), the inter-electrode voltage (ΔV2=20 V) at the right side of the micromirror 3 becomes larger than the inter-electrode voltage (ΔV1=15 V) at the left side, and as shown in FIG. 4D, the micromirror 3 transitions to the right tilt. When the micromirror 3 transitions to the right tilt, the distance to the second address electrode 23b becomes short, so that the electrostatic force becomes large relatively, and the micromirror is kept in a state in which the right side lands on the landing site 21.

Here, when the right side lands, since the vibration at the instant of contact is suppressed, the micromirror 3 does not cause an erroneous operation according to the vibration state. The drive circuit 51 outputs next displacement signals Q and /Q to the fixed electrode 23, and as shown at a position denoted by character (E) in FIG. 5, writing Tw of the next displacement signal is performed.

In a first embodiment, the controller 61 sends a voltage decreasing signal to a control part 63 provided to be attached to the spatial light modulator array 100. The control part 63 having received the voltage decreasing signal decreases the common voltage Vb of each of the spatial light modulators 200 at a specified timing through a common voltage generator 65. The common voltage Vb is supplied to each row in common.

FIG. 6 is an operation explanatory view showing the behavior of the movable part in the driving method of the invention by correlation of displacement and speed with time.

In the case where voltage is applied to the movable electrode 3 to drive and displace the micromirror 3, the specified timing is set by the control part 63 before the micromirror 3 reaches the final displacement position. As shown in FIG. 6, the common voltage Vb is decreased before the micromirror is displaced to the final displacement position, so that the speed before the micromirror 3 comes in contact with the landing site 21 as the stop member is reduced, and becomes substantially zero at the instant of the contact. Accordingly, although the vibration continues after the contact, as shown by a broken line in FIG. 6, in the case of the conventional driving in which there is no control of the common voltage Vb, in the case where the common voltage Vb is controlled, the vibration disappears after the contact as shown by a solid line in FIG. 6. That is, by this, it is not necessary to wait for the vibration damping time Ts, and it becomes possible to start the writing.

Figure 7A:
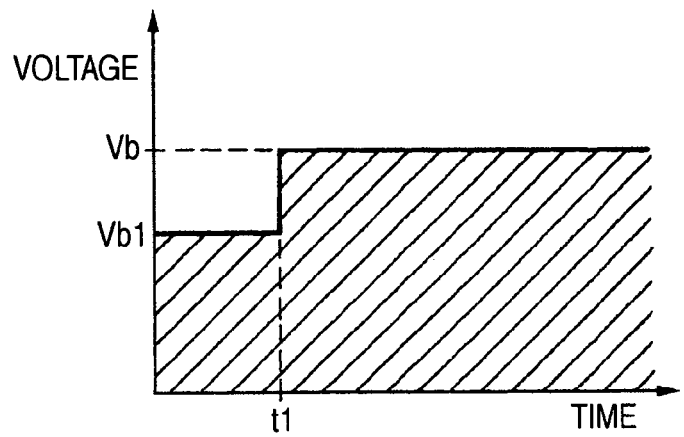
FIGS. 7A to 7C are explanatory views showing application examples of common voltage for making the speed of the movable part substantially zero.
Figure 7B:
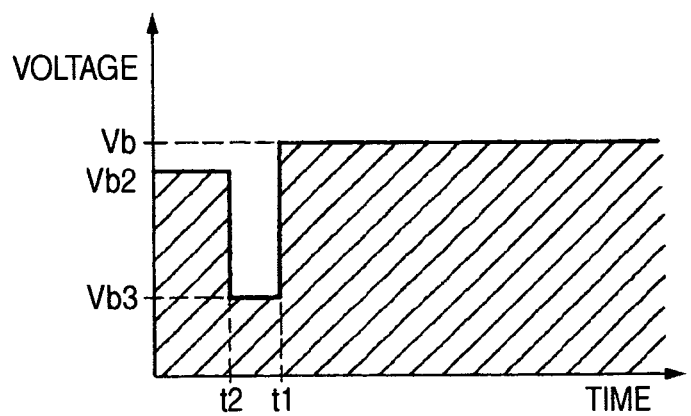
Figure 7C:
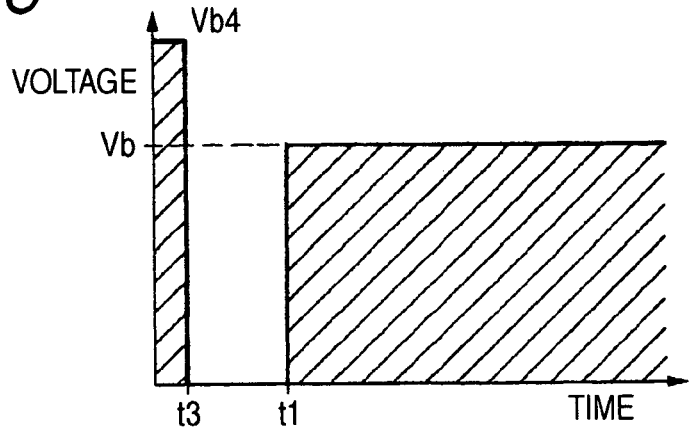

FIGS. 7A to 7C are explanatory views showing application examples of the common voltage to make the speed of the movable part substantially zero.

As a more specific application method of the common voltage Vb, as shown in FIG. 7A, a method is conceivable in which the common voltage Vb is decreased to a given value Vb1 until immediately before a contact time t1 when the micromirror 3 comes in contact with the landing site 21. Besides, as shown in FIG. 7B, a method is conceivable in which a low common voltage Vb2 is previously applied, and is further decreased to a common voltage Vb3 immediately before the contact time t1. In this method, the speed is reduced from the first, and is further reduced immediately before, so that a smooth speed reduction effect can be obtained. Further, as shown in FIG. 7C, a method is conceivable in which a high common voltage Vb4 is applied previously, and the common voltage Vb4 is decreased at t3 before the contact time t1. This method can also cause the speed reduction effect by the decrease of the common voltage Vb5.

Figure 8:
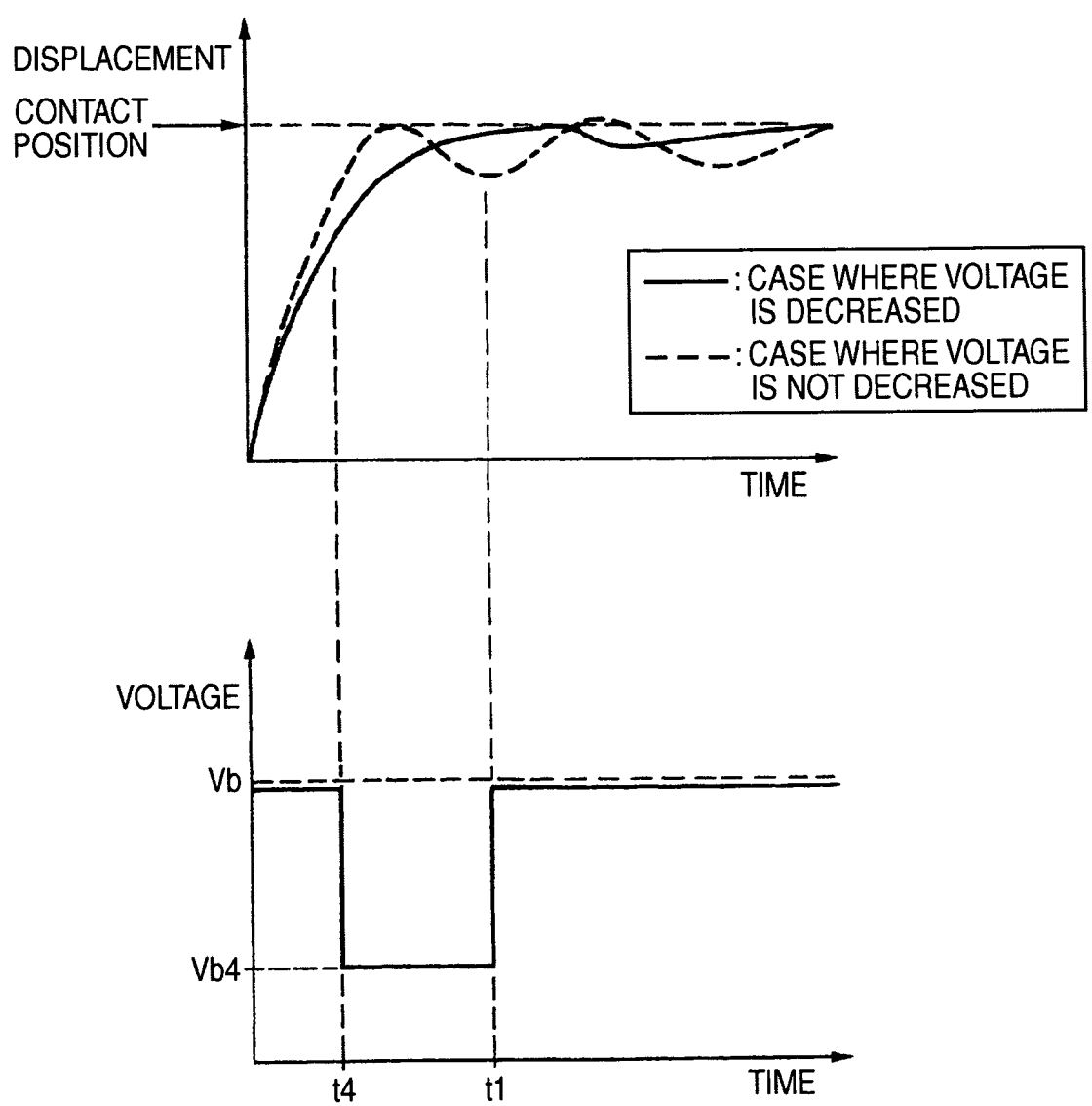
FIG. 8 is an operation explanatory view showing a modified example of a first embodiment.

FIG. 8 is an operation explanatory view showing a modified example of the first embodiment.

In the above embodiment, although the control in which the speed at the instant when the micromirror 3 comes in contact with the landing site 21 is made substantially zero has been described as an example, the common voltage control may be such that a voltage is merely decreased to a given voltage Vb4 in a period from a time t4 before the contact to a contact time t1. In this case, since the speed is reduced and the micromirror comes in contact with the landing site 21, a slight vibration remains after the contact (solid line in FIG. 8). However, as compared with a case (broken line in FIG. 8) in which the common voltage control is not performed, the effect of shortening the vibration damping time by a specified amount can be obtained.

Here, in the spatial light modulator array 100 in which the plural spatial light modulators 200 are arranged, as described above, in the case where the effect of shortening the vibration damping time by the specified amount is obtained by performing the common voltage control (the control in which the absolute value of the inter-electrode voltage between the movable electrode 3 and the second address electrode 23b is decreased before the arrival to the landing site 21), since the common voltage Vb is supplied to each row in common, it is desirable to perform the common voltage control when the timings (phases of vibration waveforms) of the micromirrors 3 in the respective spatial light modulators 100 become consistent with each other. The reason is that in the case where the micromirrors 3 different in phase are subjected to the common voltage control, even if the vibration attenuation effect can be obtained in one micromirror 3, there is a possibility that the vibration of the other micromirror 3 is amplified and an erroneous operation is performed.

Then, in the following embodiment, a description will be given to a method of synchronizing the phases of the plural spatial light modulators 200 in order to efficiently obtain the vibration attenuation effect.

Figure 9:
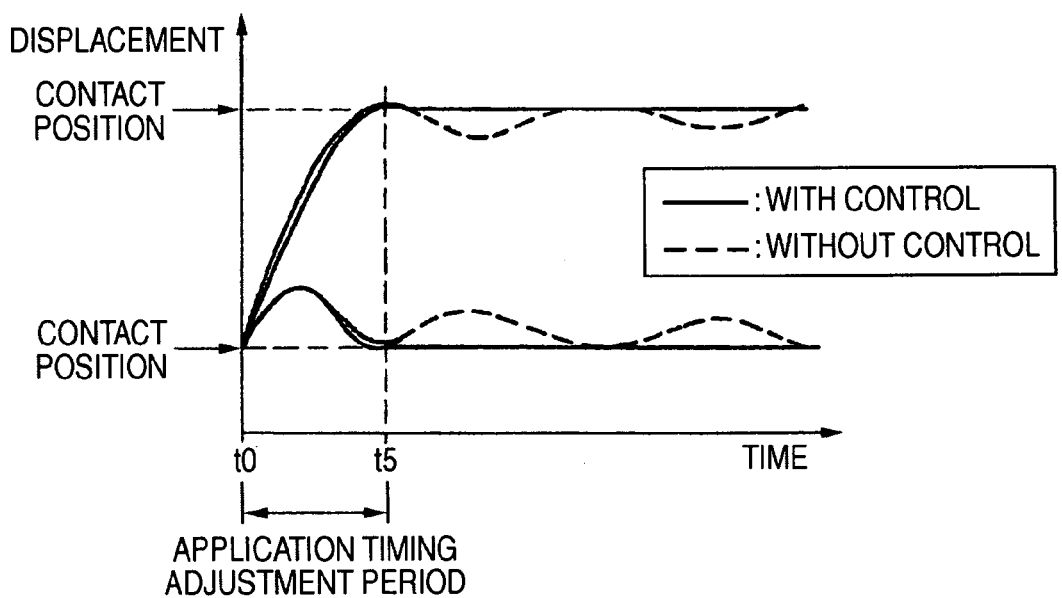
FIG. 9 is an operation explanatory view showing, by correlation of displacement with time, the behaviors of movable parts in a case where phases of the movable parts are forcibly synchronized.
Figure 10:
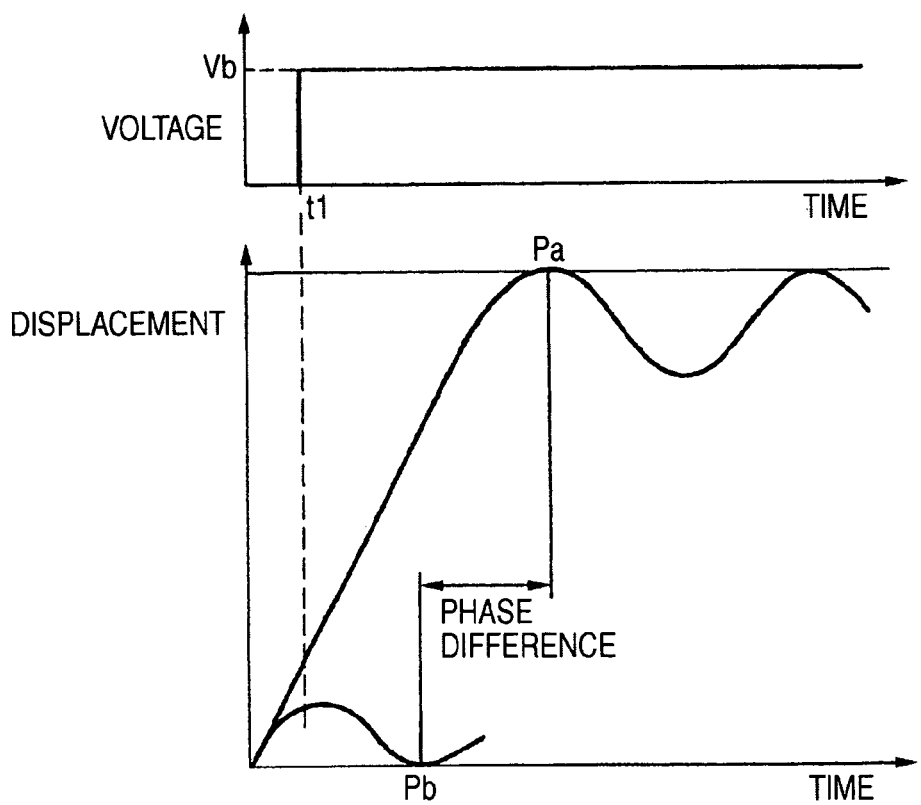
FIG. 10 is an operation explanatory view showing, by correlation of displacement and common voltage with time, the behaviors of movable parts in a case where phases are not synchronized.
Figure 11:
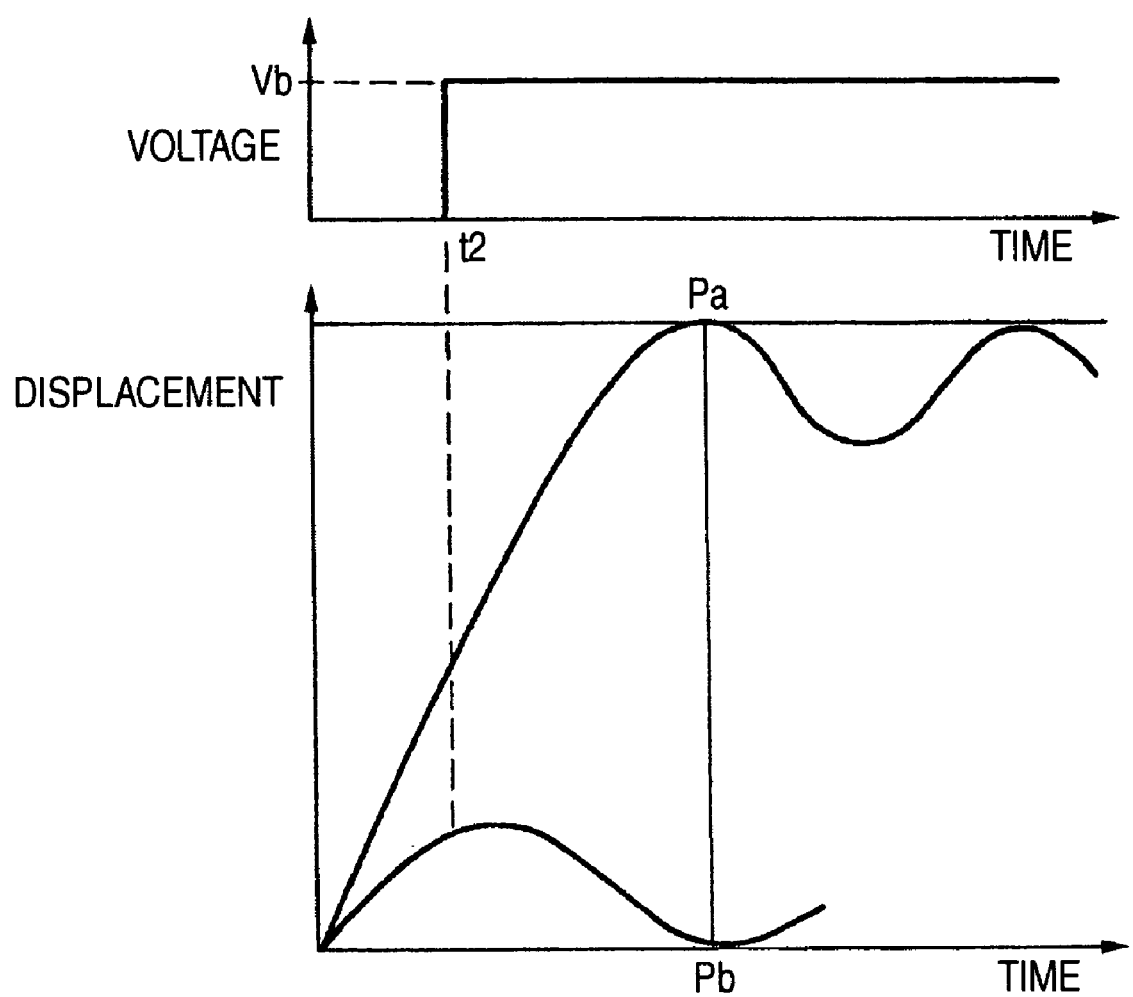
FIG. 11 is an operation explanatory view showing, by correlation of displacement and common voltage with time, the behaviors of movable parts in a case where phases are synchronized.
Figure 12:
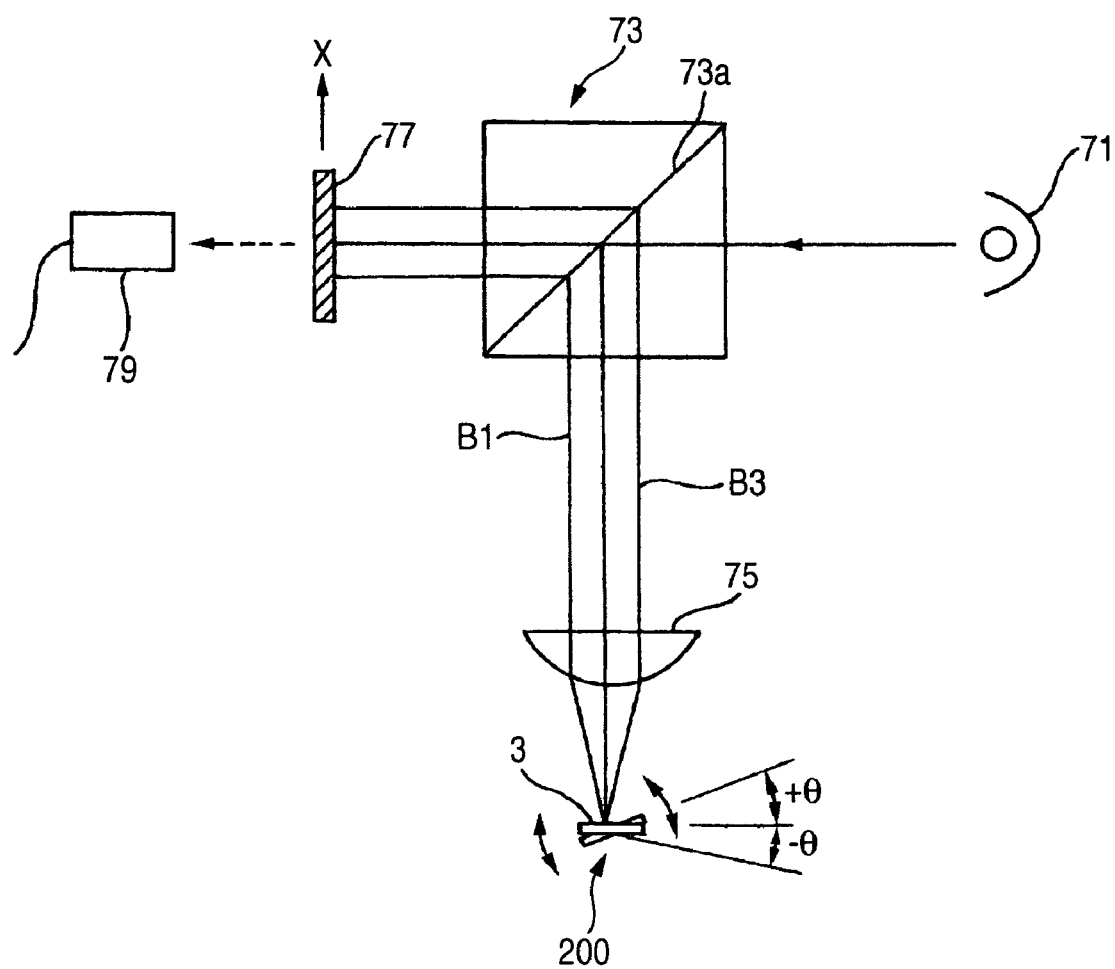
FIG. 12 is a conceptual view of a device structure for measuring waveform characteristics.

FIG. 9 is an operation explanatory view showing, by correlation of displacement with time, the behaviors of movable parts in the case where phases of the movable parts are forcibly synchronized, FIG. 10 is an operation explanatory view showing, by correlation of displacement and common voltage with time, the behaviors of movable parts in which phases are not synchronized, FIG. 11 is an operation explanatory view showing, by correlation of displacement and common voltage with time, the behaviors of movable parts in which phases are synchronized, and FIG. 12 is a conceptual view of a device structure for measuring waveform characteristics.

In the second embodiment, as shown in FIG. 9, there is shows an example in which from a state in which one micromirror 3 and the other micro mirror 3 are in the same contact position (lower contact position in the drawing), the one micromirror 3 transitions to another contact position (upper contact position), and the other micromirror 3 remains in the same contact position (lower contact position).

In this embodiment, timings when the one micromirror 3 and the other micromirror 3 in the same contact position (lower contact position) transition to next contact states are simultaneously controlled by the common voltage control. The common voltage control is performed in a period of from t0 to t5 in which the micromirror transitions from the first contact position to the next contact position. In the case where the common voltage control is not performed, that is, as shown in FIG. 10, in the case where the common voltage is applied as in the related art, timings Pa and Pb of phases when the one micromirror 3 and the other micromirror 3 reach the first contact positions are different from each other, and a phase difference occurs. Accordingly, even if the common voltage control is performed in this state, there is a fear that an erroneous operation occurs.

In this embodiment, the common voltage, which is conventionally applied at t1 from the start of transition, is applied at a specified changed time t2 as shown in FIG. 11. By this, while the inertia force resulting from the behavior of the micromirror 3 and the electrostatic force resulting from the inter-electrode voltage and generated by the application of the common voltage are used as parameters, the phase synchronization (Pa=Pb) of the one micromirror 3 and the other micromirror 3 becomes possible.

The specified time t2 can be set when the waveform characteristics of the spatial light modulator array 100 as an object to be measured are previously measured. The specified time t2 obtained in this way is stored in, for example, the memory circuit of the drive circuit 51. Here, the waveform characteristics of each of the spatial light modulators 200 can be obtained by, for example, the device structure shown in FIG. 12. In FIG. 12, reference numeral 71 denotes a light source; 73, an optical system including a half mirror 73a and for reflecting light from light source 71 to a micromirror 3 and changing reflected light from the micromirror 3 to the left; 75, an objective lens for concentrating a light flux between the optical system 73 and the micromirror 3 toward the micromirror 3; 77, a filter having gradation in which light transmissivity is continuously changed in a given direction (for example, the vertical direction of FIG. 12); and 79, a light receiving sensor for detecting light transmitted through the filter 77.

By using the device structure as stated above, when light is incident on the optical system 73 from the light source 71, the light reflected by the half mirror 73a is irradiated to the micromirror 3 through the objective lens 75. Here, the micromirror 3 is displaced in a range of a specified angle θ.

A light B1 reflected when the micromirror 3 is in the displacement position of an angle +θ is transmitted through a lower part of the filter 77 to become a small transmission light, and a light B3 reflected when the micromirror 3 is in the displacement position of an angle −θ is transmitted through an upper side of the filter 77 to become a large transmission light. Accordingly, the waveform characteristics of the spatial light modulator 200 as the object to be measured can be obtained by the correlation of the detected light amount of the light receiving sensor 79 with the detection time.

Accordingly, in this embodiment, the phases are synchronized as stated above, so that the vibration attenuation effect by the above operation can be obtained, and as a result, after the micromirror 3 comes in contact with the landing site 21, the vibration disappears as indicated by a solid line in FIG. 9.

Next, a modified example of the second embodiment to synchronize the phases of the plural spatial light modulators 200 will be described.

Figure 13:
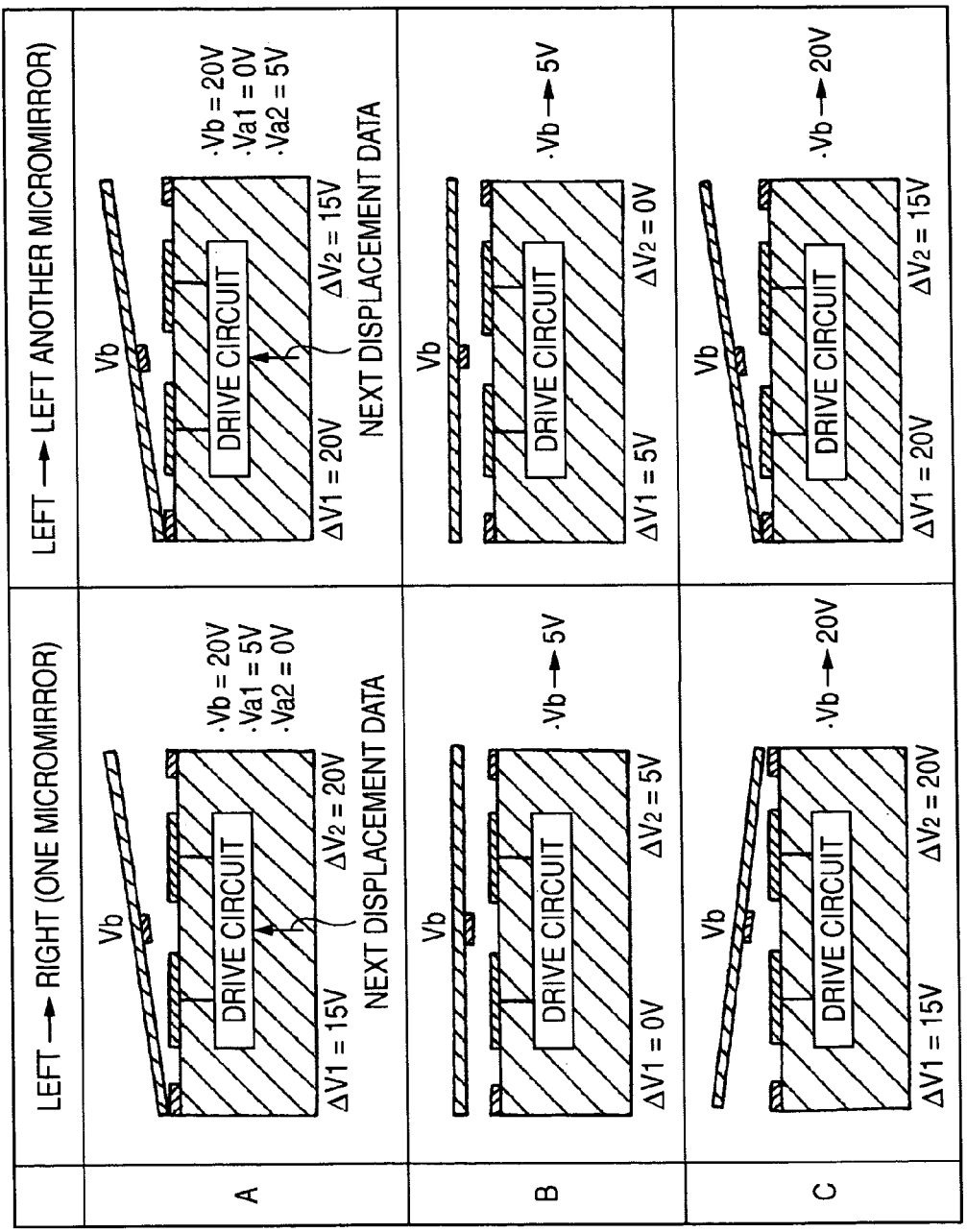
FIG. 13 is an explanatory view showing behaviors of movable parts in a modified example of a second embodiment.
Figure 14:
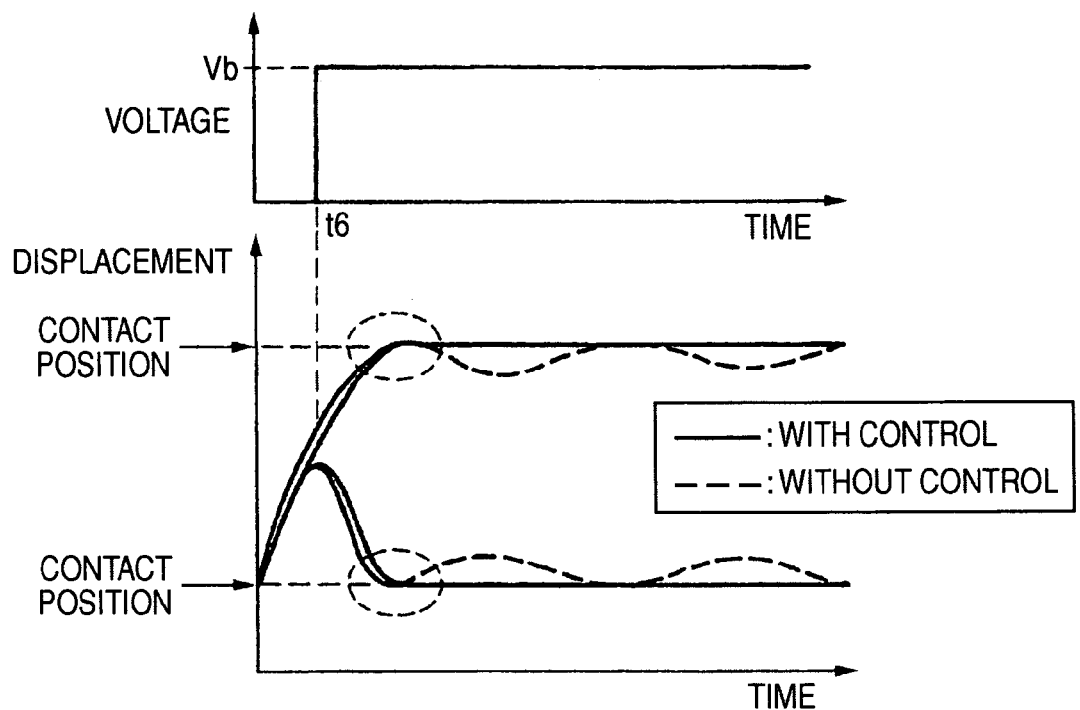
FIG. 14 is an explanatory view of a drive sequence in the modified example of the second embodiment.

FIG. 13 is an explanatory view showing the behaviors of movable parts in the modified example of the second embodiment, and FIG. 14 is an explanatory view of a drive sequence in the modified example of the second embodiment.

In this modified example, a case is exemplified in which one micromirror 3 transitions from a first position (left tilt position of FIG. 13) to a second position (right tilt position of FIG. 13), and the other micromirror 3 maintains a state from the first position (left tilt position of FIG. 13) to the first position (left tilt position of FIG. 13). That is, in the initial state shown in A of FIG. 13, voltages are applied to a first address electrode 23a and a second address electrode 23b (Va1>Va2), the one micromirror 3 is tilted to the left, and a given voltage Vb (+20 V) is applied to the movable electrode 3.

Next, when the common voltage Vb is lowered (for example, Vb=5 V), as shown in B of FIG. 13, an electrostatic force at the left side of the micromirror 3 disappears (ΔV1=0), a slight electrostatic force is exerted at the right side (ΔV2=5 V), the elastic restoring force of the hinge 11 is applied thereto, the left side of the micromirror 3 rises, and there occurs a state in which the holding of the left tile is released.

Next, as shown in C of FIG. 13, when the common voltage Vb is returned to the original given value (Vb=20 V), the inter-electrode voltage (ΔV2=20 V) at the right side of the micromirror 3 becomes larger than the inter-electrode voltage (ΔV1=15 V) at the right side, and the micromirror 3 transitions to the right tilt.

On the other hand, with respect to the other micromirror 3, in the initial state shown in A of FIG. 13, voltages are applied to a first address electrode 23a and a second address electrode 23b (Va1<Va2), so that the other micromirror is tilted to the left, and a given common voltage Vb (+20 V) is applied to the movable electrode 3. Next, as shown in B of FIG. 13, when the common voltage Vb is lowered (for example, Vb=5 V), an electrostatic force at the right side of the micromirror 3 disappears (ΔV2=0), a slight electrostatic force (ΔV1=5 V) is exerted at the left side, the elastic restoring force of the hinge 11 is added thereto, the left side of the micromirror 3 rises, and there occurs a state in which the holding of the left tilt is released.

Next, as shown in C of FIG. 13, when the common voltage Vb is returned to the original given value (Vb=20 V), the inter-electrode voltage (ΔV1=20 V) at the left side of the micromirror 3 becomes larger than the inter-electrode voltage (ΔV2=15 V) at the left side, and the micromirror 3 is again returned to the left tilt.

In the behavior of the micromirror 3 as stated above, at the timing shown in B of FIG. 13, both the one micromirror 3 and the other micromirror 3 are released from the latch state, and are brought into substantially the horizontal state by the elastic restoring force of the hinge 11. In the modified example, the common voltage Vb is applied at this timing t6 shown in FIG. 14. Accordingly, since both the micromirrors 3 have the horizontal posture, when the common voltage Vb is simultaneously applied, even in the different transitions to the left and the right, as shown in FIG. 14, the first contacts occur at the same time, and the phases of the plural different spatial light modulators 200 can be synchronized.

In this modified example, the phases are synchronized as stated above, so that the vibration attenuation effect by the above operation can be obtained, and as a result, after the micromirror 3 comes in contact with the landing site 21, the vibration disappears as indicated by a solid line in FIG. 14.

Next, a third embodiment in which phases of plural spatial light modulators 300 are synchronized will be described.

Figure 15:
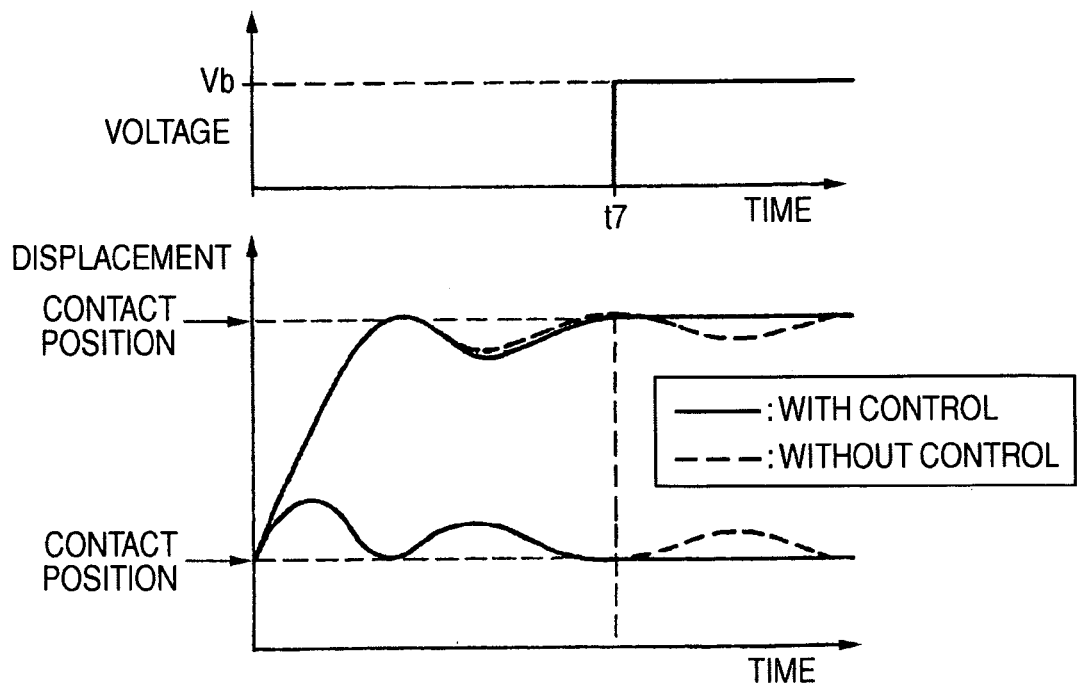
FIG. 15 is an operation explanatory view showing, by correlation of displacement and common voltage with time, the behaviors of movable parts in a third embodiment.

FIG. 15 is an operation explanatory view showing, by correlation of displacement and common voltage with time, the behaviors of movable parts in the third embodiment.

In the third embodiment, waveform characteristics of one micromirror 3 and the other micromirror 3 are previously obtained by the measurement device shown in FIG. 12, and a timing t7 when phases of both the micromirrors 3 are first synchronized is obtained in advance. The common voltage control is performed at the timing t7.

In this embodiment, differently from the above respective embodiments, a possibility that phase synchronization is performed after the contact of the micromirrors 3 becomes high. However, even in the case, the vibration attenuation effect by the above operation can be obtained, and as a result, the vibration disappears after the common voltage control as indicated by a solid line in FIG. 15. Besides, in the above respective embodiments, although the contact spatial light modulator 200 has been exemplified, as described later, in the case of a non-contact spatial light modulator, the phase synchronization means according to the third embodiment becomes effective means for obtaining the vibration attenuation effect by the above operation.

Next, a fourth embodiment in which phases of plural spatial light modulator 200 are not synthesized will be described.

Figure 16:
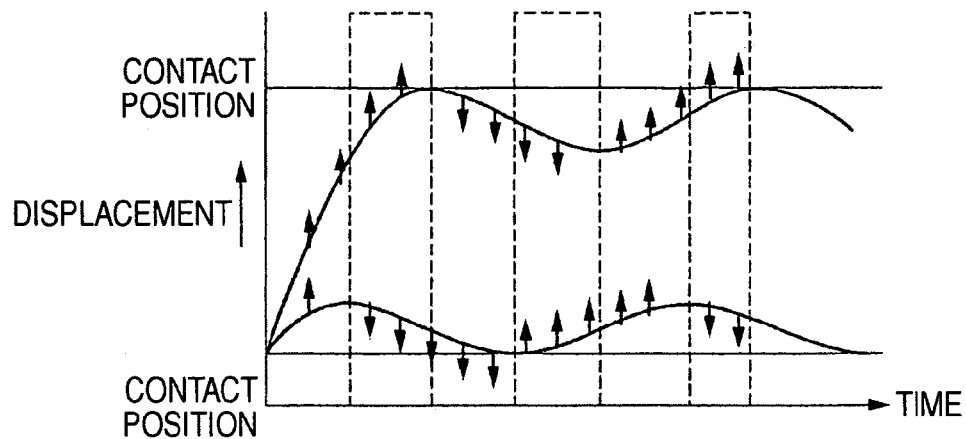
FIG. 16 is a explanatory view showing, by correlation of displacement and speed with time, the behavior of a movable part in a fourth embodiment.

FIG. 16 is an operation explanatory view showing, by correlation of displacement and common voltage with time, the behavior of a movable part in the fourth embodiment. In this fourth embodiment, waveform characteristics of one micromirror 3 and another micromirror 3 are determined in advance by the measuring equipment as illustrated in FIG. 12, and the period in which the micromirrors 3 have the same transition state to the fixed electrodes is preset. The common voltage control is performed in the period having the same transition state so that the vibration is suppressed.

Figure 17:
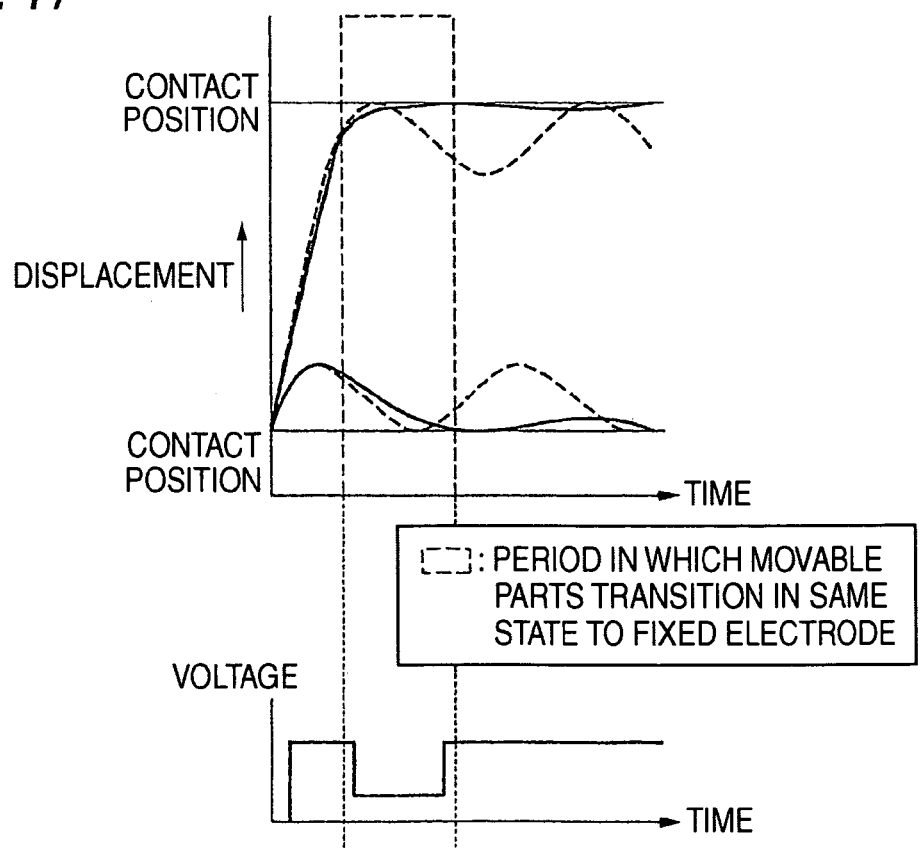
FIG. 17 is an operation explanatory view showing, by correlation of displacement and common voltage with time, the behaviors of movable parts in a fourth embodiment.

Accordingly, in the embodiment, by extracting the period having the same transition state, the vibration attenuation effect can be obtained due to the above action. As a result, the vibration of the micromirror 3 is attenuated as described in FIG. 17. However, it is necessary to note that the transition state is shifted with the voltage application.

Next, a fifth embodiment in which vibrations of plural spatial light modulator 200 are attenuated will be described.

Figure 18:
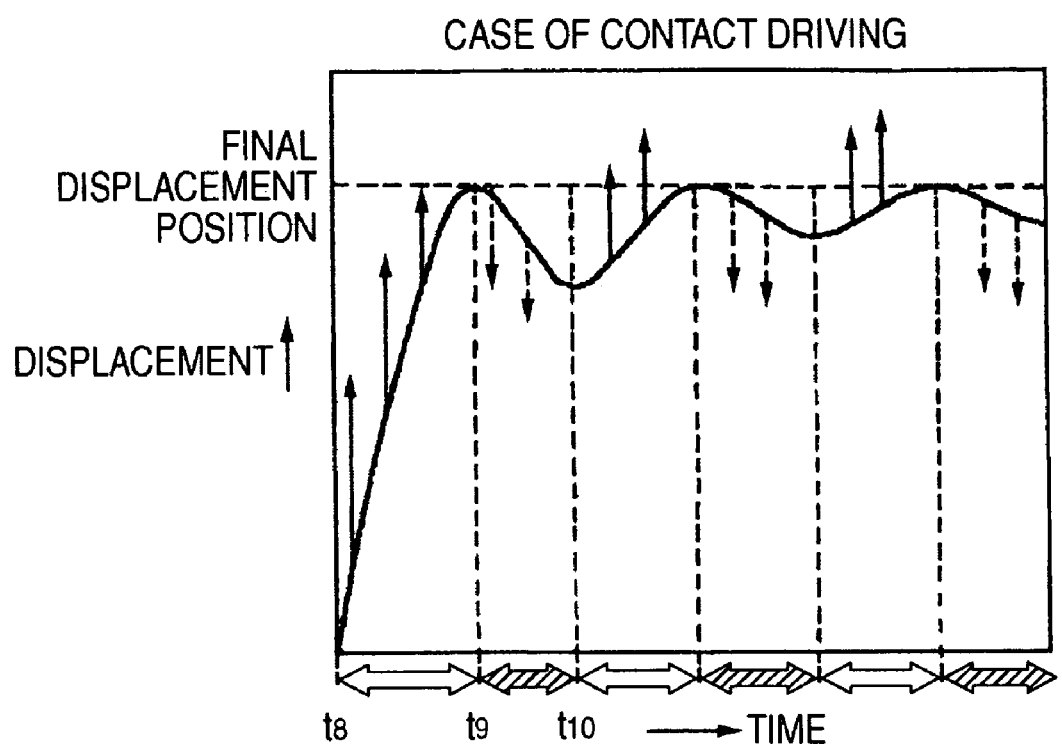
FIG. 18 is an operation explanatory view showing, by correlation of displacement and common voltage with time, the behavior of a movable part in a fifth embodiment.

FIG. 18 is an operation explanatory view showing, by correlation of displacement and common voltage with time, the behavior of a movable part in the fifth embodiment.

Figure 19:
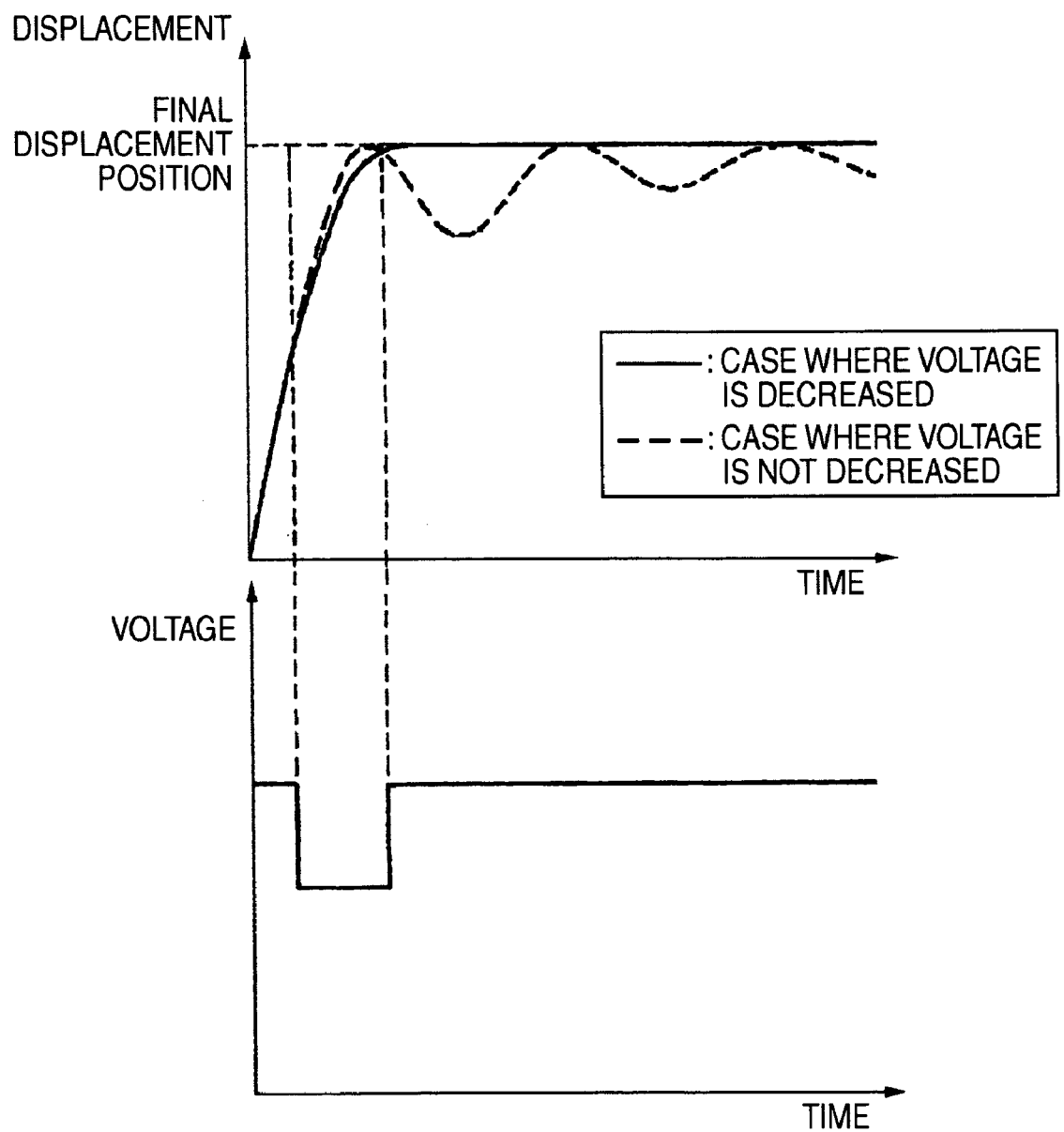
FIG. 19 is an explanatory view showing a control to decrease a common voltage to be applied while a transition is made in a fixed electrode direction.
Figure 20:
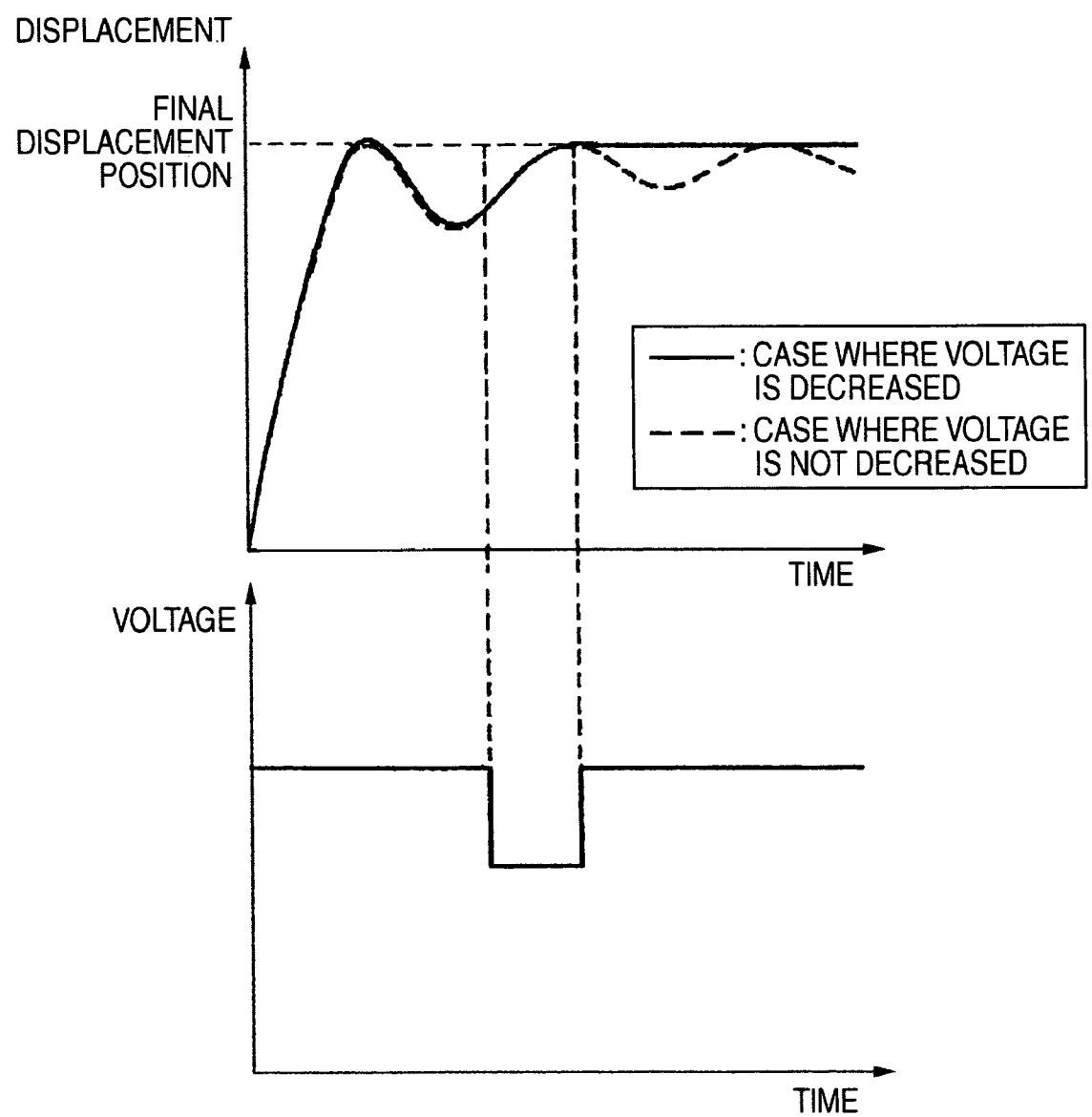
FIG. 20 is an explanatory view showing another control to decrease a common voltage to be applied while a transition is made in a fixed electrode direction.
Figure 21:
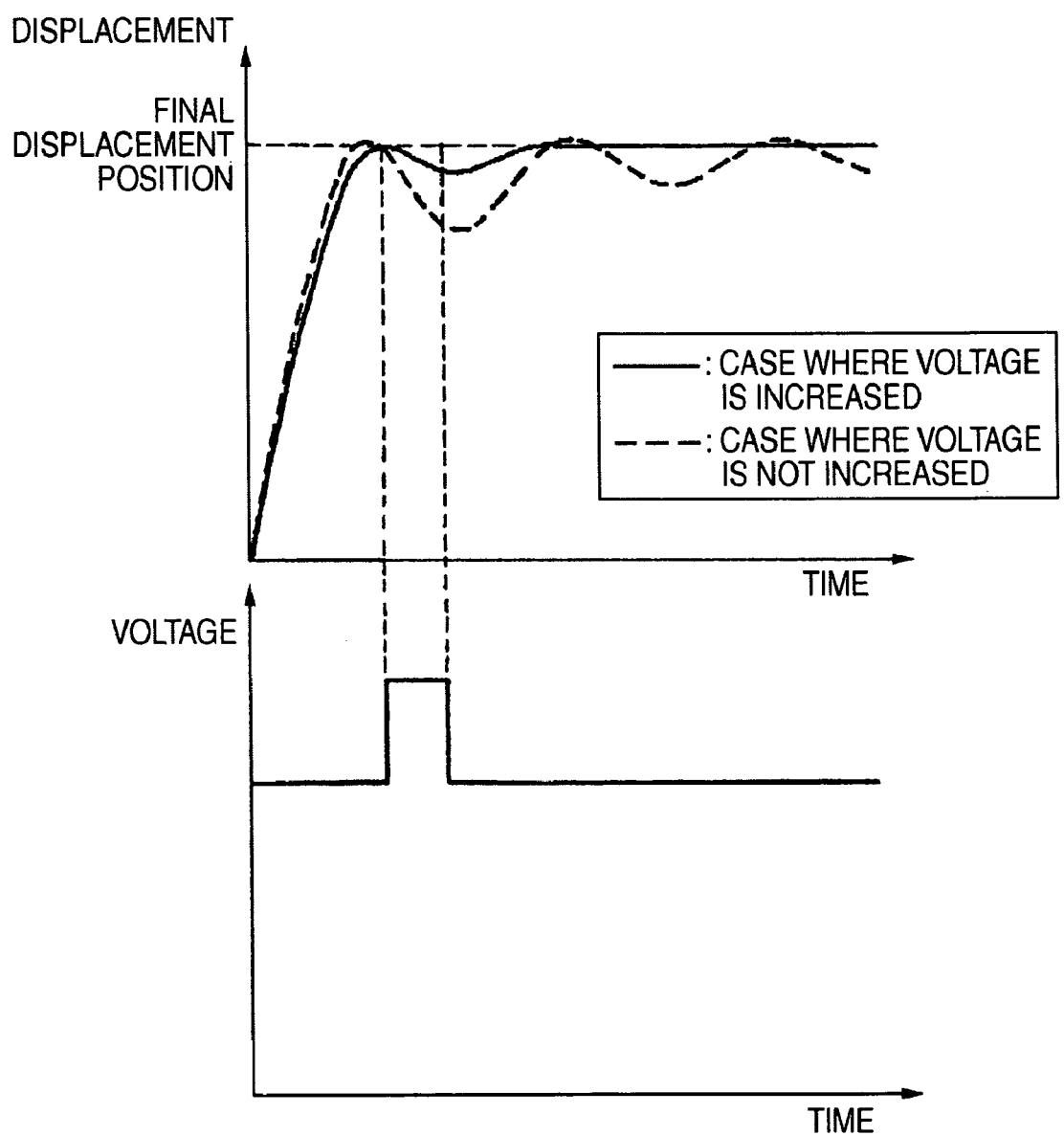
FIG. 21 is an explanatory view showing a control to increase a common voltage to be applied while a transition is made in an opposite direction to a fixed electrode.
Figure 22:
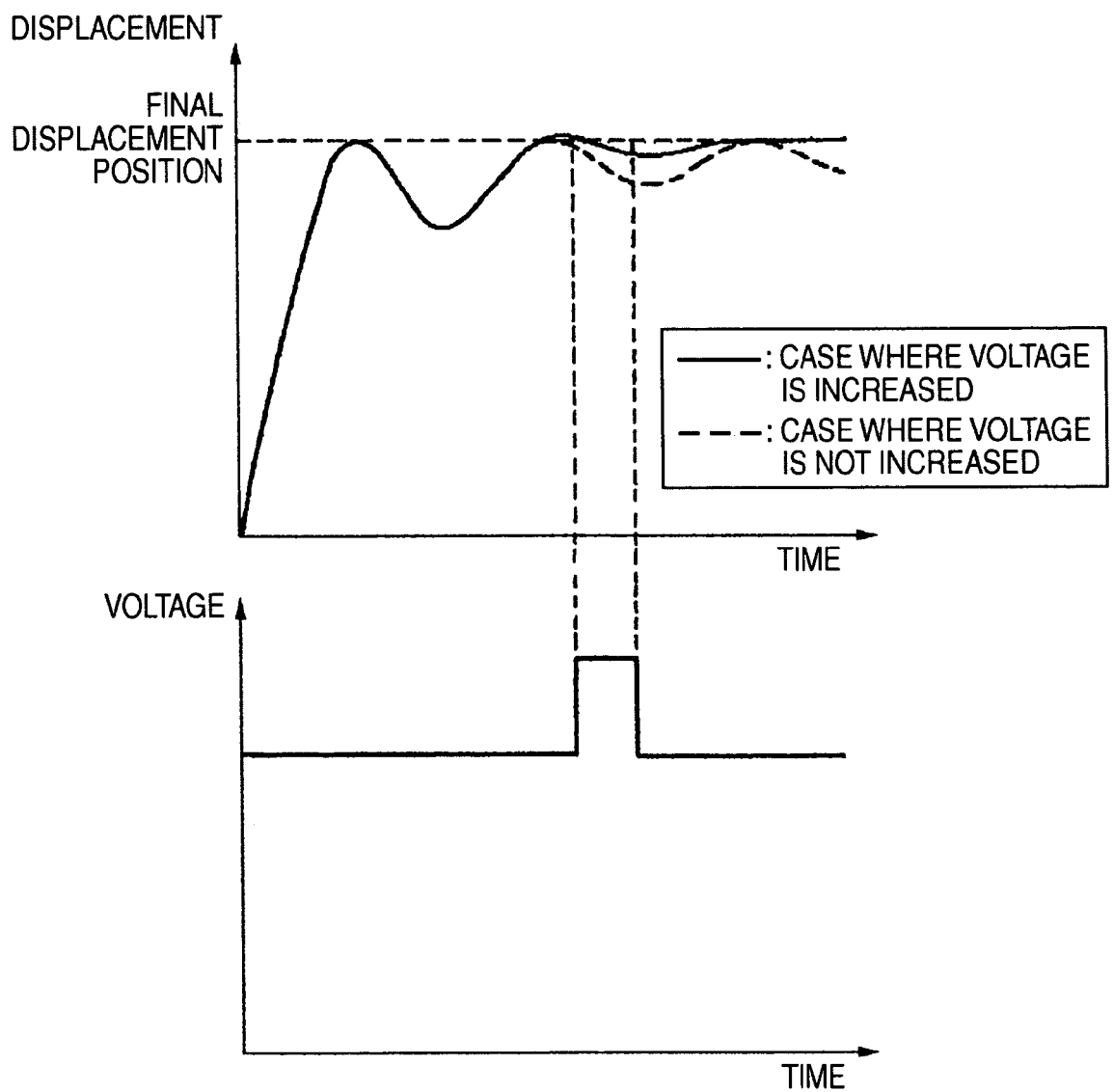
FIG. 22 is an explanatory view showing another control to increase a common voltage to be applied while a transition is made in an opposite direction to a fixed electrode.
Figure 23:
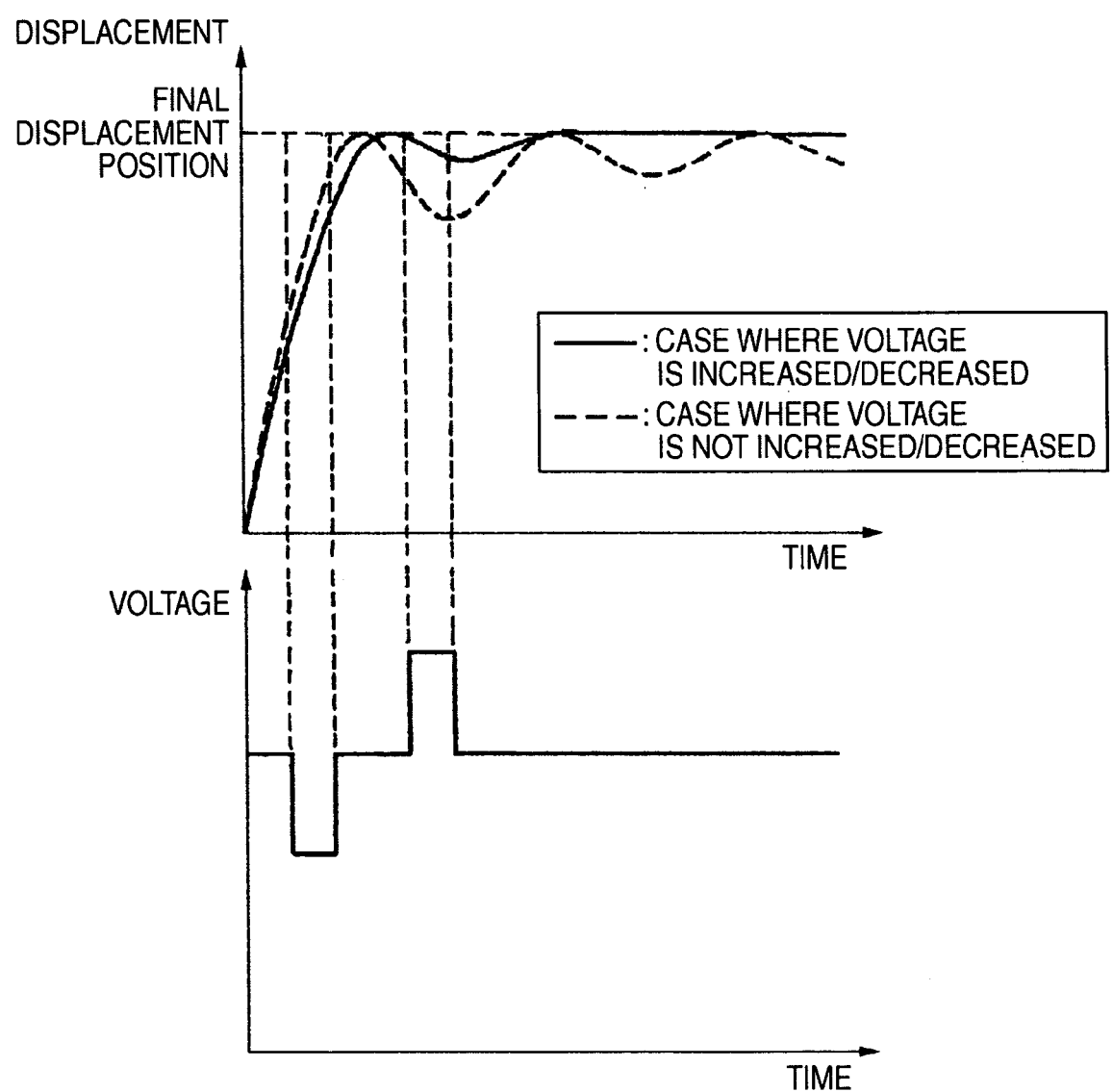
FIG. 23 is an explanatory view showing a control to decrease and increase a common voltage.

FIGS. 19 and 20 are explanatory views showing controls to decrease a common voltage to be applied while a transition is made in a fixed electrode direction, FIGS. 21 and 22 are explanatory views showing controls to increase a common voltage to be applied while a transition is made in an opposite direction to the fixed electrode, and FIG. 23 is an explanatory view showing a control to decrease and increase a common voltage.

In the fifth embodiment, as shown in FIG. 18, attention is paid to a fact that there is a period of t8 to t9 in which the micromirror 3 is displaced toward the fixed electrode, and a period of t9 to t10 in which it is displaced in the opposite direction to the fixed electrode, and controls of the common electrode different in the respective periods are performed.

First, as shown in FIG. 19, according to the control in which the common voltage to be applied is decreased while the micromirror 3 transitions in the fixed electrode direction, the speed of the micromirror 3 is reduced before it reaches the final displacement position, and the vibration after the contact with the landing site 21 can be eliminated.

The timing when the common voltage is decreased may be after the micromirror 3 lands as shown in FIG. 20. In that case, as compared with the case where an electrostatic attraction is lowered by the decrease of the common voltage before the arrival to the final displacement position, the micromirror 3 can be quickly moved to the final displacement position.

Next, as shown in FIG. 21, according to the control in which the common voltage is increased while the micromirror 3 is displaced in the opposite direction to the fixed electrode, when the micromirror is separated from the fixed electrode, a force to pull back to the fixed electrode side is exerted on the micromirror 3, and the occurrence of vibration can be suppressed.

Besides, as shown in FIG. 22, the timing when the common voltage is increased may be after the landing of the micromirror 3, and in that case, the micromirror 3 can be quickly moved to the final displacement position.

As shown in FIG. 23, the control shown in FIGS. 19 and 20 and the control shown in FIGS. 21 and 22 are combined with each other, and a control is performed in which the common voltage to be applied is decreased while the micromirror 3 transitions in the fixed electrode direction, and the common voltage is increased while the micromirror 3 transitions in the opposite direction to the fixed electrode, so that the vibration is synergistically suppressed, and a steady state can be quickly achieved at the final displacement position.

In addition, in the above embodiment, the increase and the decrease of the voltage are performed once respectively. However, the voltage application may be performed more than once, thereby the same effect can be obtained.

Further, in the above embodiment, the increase and the decrease of the voltage are represented like pulse wave as one example, it is not limited thereto, sine curve, triangular wave, and saw wave cause the same effect as the above embodiment.

In the above, although the case of the contact spatial light modulator array 100 in which the micromirror 3 comes in contact with the landing site 21 as the stop member has been exemplified, the invention is also applied to a non-contact spatial light modulator array, and the effect can be obtained.

Figure 24:
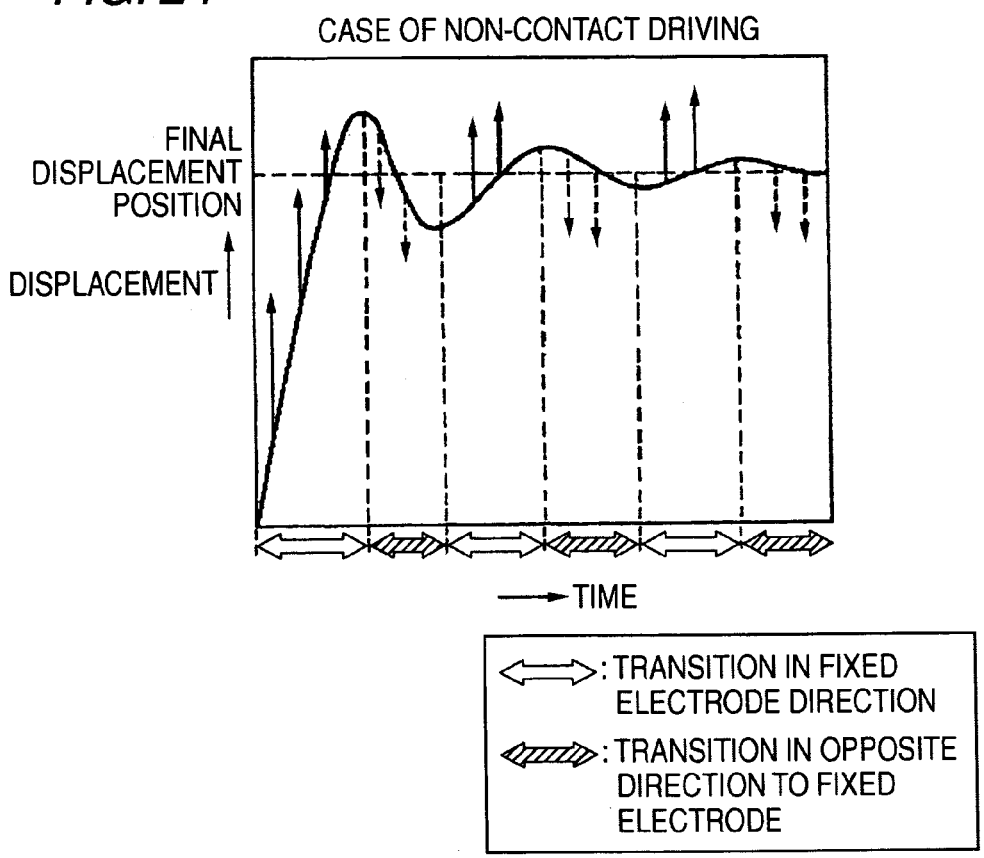
FIG. 24 is an explanatory view showing a displacement direction of a micromirror in a non-contact spatial light modulator.

FIG. 24 shows a displacement operation of a micromirror of a non-contact drive system spatial light modulator and corresponds to FIG. 18. Also in this case, a period of transition in a fixed electrode direction is separated from a period of transition in the opposite direction to the fixed electrode, and similarly to the foregoing contact drive system, controls of a common voltage different in the respective periods can be performed. That is, the common voltage Vb is decreased, increased, or increased/decreased, so that overshoot and vibration after the micromirror 3 reaches the final displacement position can be suppressed or almost eliminated. As a result, the drive cycle can be shortened.

Incidentally, in the non-contact spatial light modulator array, for example, when the drive voltage of the spatial light modulator array 100 is lowered, non-contact driving becomes possible. However, the invention is not limited to this, but can also be applied to another structure within the scope not departing from the gist of the invention.

Figure 25:
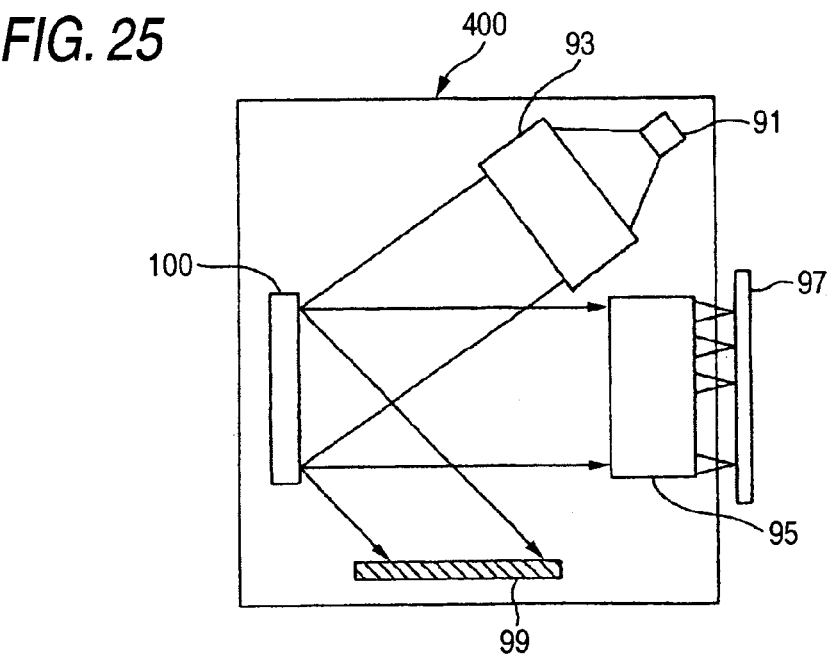
FIG. 25 is a view showing a rough structure of an exposure apparatus constructed by using a spatial light modulator array of the invention.

Next, an image forming apparatus constructed by using the above spatial light modulator array 100 will be described. Here, as an example of the image forming apparatus, first, an exposure apparatus 400 will be described. FIG. 25 is a view showing a rough structure of an exposure apparatus constructed by using the spatial light modulator array of the invention. The exposure apparatus 400 includes an illumination light source 91, an illumination optical system 93, a spatial light modulator array 100 in which the spatial light modulators 200 of the embodiment are arranged two-dimensionally on the same plane, and a projection optical system 95.

The illumination optical source 91 is a light source such as a laser, a high pressure mercury lamp or a short arc lamp. The illumination optical system 93 is, for example, a collimating lens for converting a planar light emitted from the illumination light source 91 in to a parallel light. The parallel light having been transmitted through the collimating lens is vertically incident on the respective spatial light modulators of the spatial light modulator array 100. As means for converting the planar light emitted from the illumination light source 91 into the parallel light, in addition to the collimating lens, there is a method of arranging two microlenses in series. Besides, a structure may be adopted in which as the illumination light source 91, one having a small luminous point, such as a short arc lamp, is used, so that the illumination light source 91 is regarded as a point light source, and the parallel light is incident on the spatial light modulator array 100. Besides, a structure may be adopted in which an LED array including LEDs corresponding to the respective spatial light modulators of the spatial light modulator array 100 is used as the illumination light source 91, and the LED array is made close to the spatial light modulator array 100 and is made to emit light, so that the parallel light is incident on the respective spatial light modulators of the spatial light modulator array 100. Incidentally, in the case where the laser is used as the illumination light source 91, the illumination light system 93 may be omitted.

The projection optical system 95 is for projecting light onto a recording medium 97 as an image formation surface, and is, for example, a microlens array including microlenses corresponding to the respective spatial light modulators of the spatial light modulator array 100.

Hereinafter, the operation of the exposure apparatus 400 will be described.

The planar light emitted from the illumination light source 91 is incident on the illumination optical system 93, and the light converted into the parallel light by this is incident on the spatial light modulator array 100. The reflection of the light incident on the respective spatial light modulators 200 of the spatial light modulator array 100 is controlled according to image signals. The light emitted from the spatial light modulator array 100 is photographed and exposed onto the image formation surface of the recording medium 97 by the projection optical system 95. While moving in the scanning direction relatively to the recording medium 97, the photograph light is projected and exposed, and can be exposed on a wide area at high resolution. As stated above, the collimating lens is provided on the light incident surface side of the spatial light modulator array 100, so that the light incident on the plane substrates of the respective modulators can be converted into the parallel light. Incidentally, reference numeral 99 in the drawing denotes a light absorber which introduces an off light.

The exposure apparatus 400 is not limited to the use of the collimating lens as the illumination optical system 93, but can be constructed by using a microlens array. In this case, the respective microlenses of the microlens array correspond to the respective spatial light modulators 200 of the spatial light modulator array 100, and are designed and adjusted so that the optical axis of each of the microlens and the focal plane coincide with the center of each of the spatial light modulators.

In this case, the incident light from the illumination light source 91 is concentrated in an area smaller than one element of the spatial light modulators 200, and is incident in the spatial light modulator array 100. The reflection of the light incident on each of the spatial light modulators 200 of the spatial light modulator array 100 is controlled according to the inputted image signals (element displacement signals Q and/Q). The light emitted from the spatial light modulator array 100 is projected and exposed onto the image formation surface of the recording medium 97 by the projection optical system 95. While moving in the scanning direction relatively to the recording medium 97, the projection light is projected and exposed, and can be exposed on a wide area at high resolution. As stated above, since the light from the illumination light source 91 can be concentrated by the microlens array, the exposure apparatus in which light use efficiency is improved can be realized.

Incidentally, the lens plane shape of the microlens is a sphere, a hemisphere face or the like, and the shape is not particularly limited, and may be a convex curved surface or a concave curved surface. Further, a flat microlens array having refractivity distribution may be used, or a microlens array may be such that Fresnel lenses or diffraction lenses by binary optics or the like are arrayed. As material of the microlens, for example, transparent glass or resin is used. In view of mass productivity, resin is excellent, and in view of life and reliability, glass is excellent. From an optical viewpoint, as the glass, quartz glass, fused silica, alkali-free glass or the like is preferable, and as the resin, acrylic resin, epoxy resin, polyester resin, polycarbonate resin, styrene resin, vinyl chloride resin or the like is preferable. Incidentally, the resin includes photo-curing resin, thermoplastic resin and the like, and it is preferable to make a suitable selection according to a manufacture method of the microlens.

Next, as another example of the image forming apparatus, a projection apparatus will be described.

Figure 26:
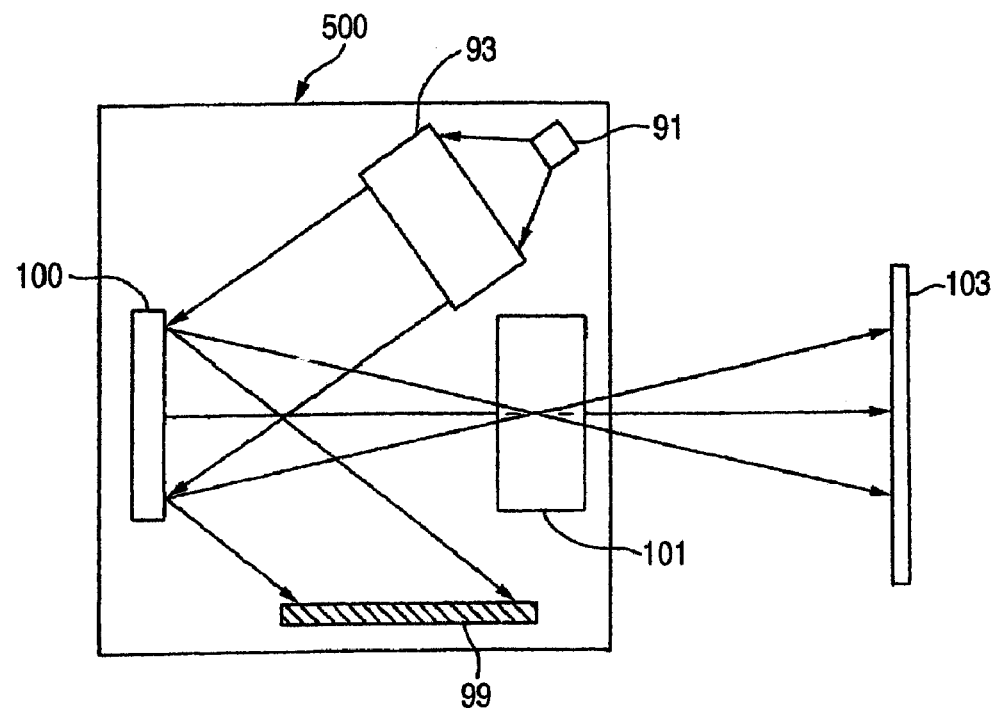
FIG. 26 is a view showing a rough structure of a projection apparatus constructed by using a spatial light modulator array of the invention.
Figure 27:
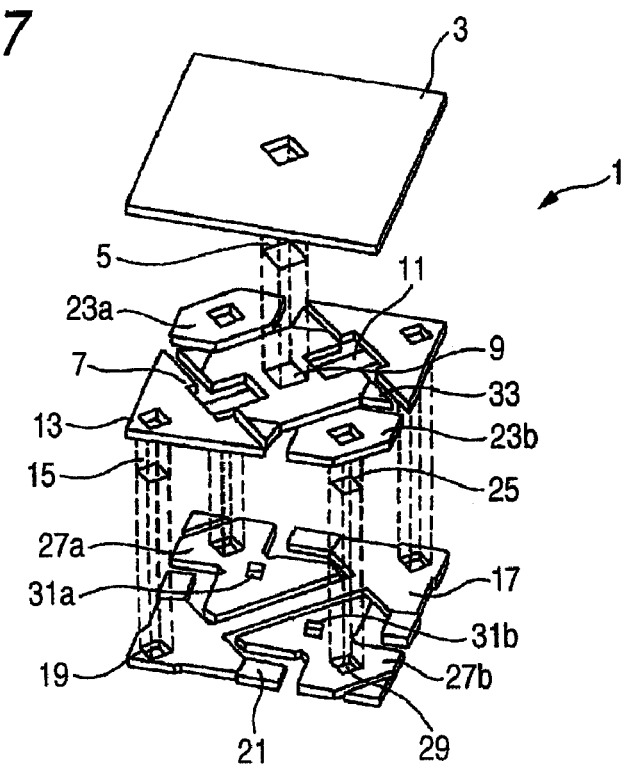
FIG. 27 is an exploded perspective view showing one pixel of a spatial light modulator array.
Figure 28:
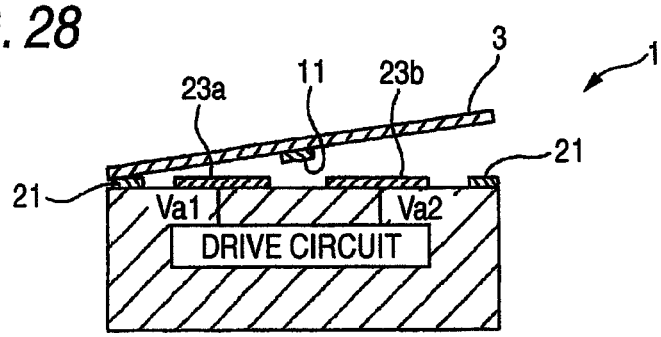
FIG. 28 is a sectional view schematically showing a spatial light modulator shown in FIG. 25.
Figure 29:
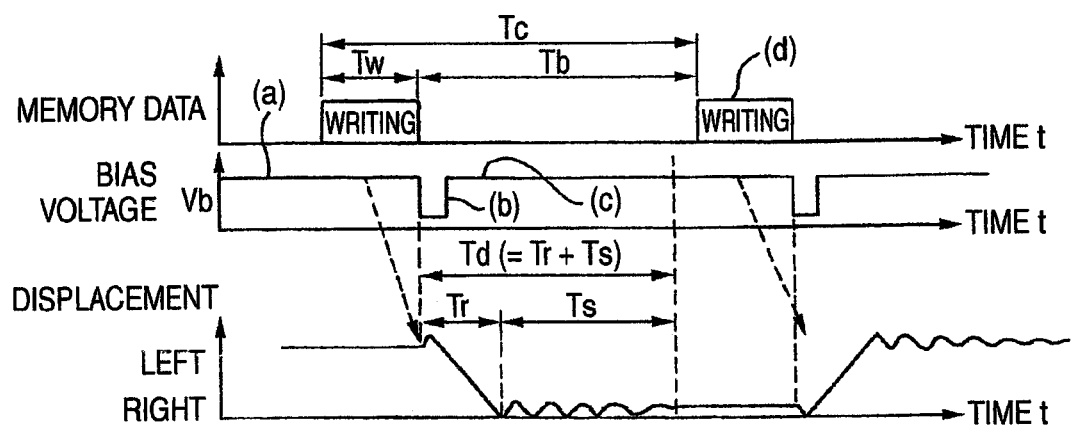
FIG. 29 is an explanatory view of a drive sequence of the spatial light modulator shown in FIG. 26.
Figure 30:
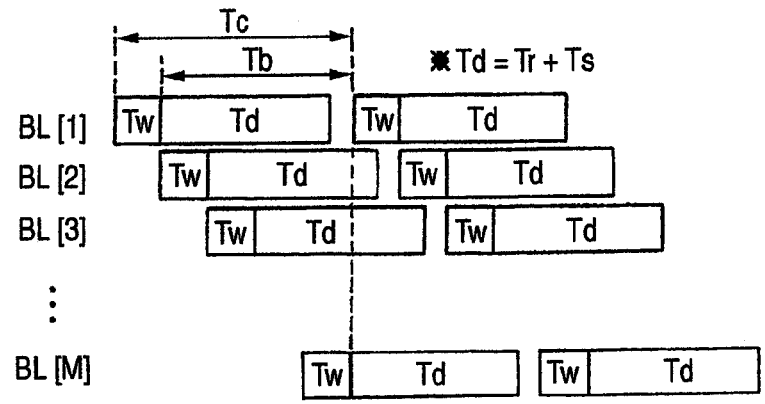
FIG. 30 is an operation explanatory view of a related art display of all pixels.
Figure 31:
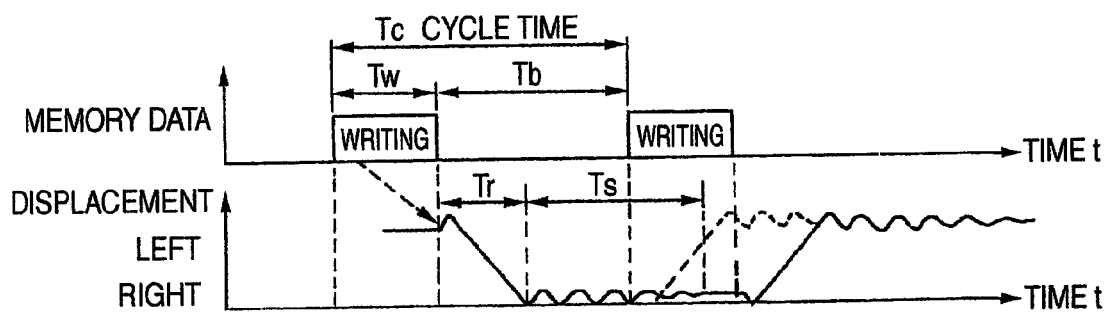
FIG. 31 is an explanatory view of a drive sequence in a case where writing is performed during a vibration damping time.

FIG. 26 is a view showing a rough structure of a projection apparatus constructed by using the spatial light modulator array of the invention. The same components as those of FIG. 25 are denoted by the same characters, and their explanation will be omitted. A projector 500 as the projection apparatus includes an illumination light source 91, an illumination optical system 93, a spatial light modulator array 100, and a projection optical system 101. The projection optical system 101 is a projection apparatus optical system for projecting light onto a screen 103 as an image formation surface. The illumination optical system 93 may be the foregoing collimating lens, or may be a microlens array.

Next, the operation of the projector 500 will be described.

The incident light from the illumination light source 91 is concentrated in an area smaller than one element of the spatial light modulators 200 by, for example, a microlens array, and is incident on the spatial light modulator array 100. The reflection of the light incident on the respective spatial light modulators 200 of the spatial light modulator array 100 is controlled according to image signals. The light emitted from the spatial light modulator array 100 is projected and exposed onto the image formation surface of the screen 103 by the projection optical system 101. As stated above, the spatial light modulator array 100 can be used also for the projection apparatus, and can be applied also to a display device.

Accordingly, in the image forming apparatus such as the exposure apparatus 400 or the projector 500, since the spatial light modulator array 100 is provided as the main part of the structure, writing of an address voltage becomes possible even in the vibration damping time without causing an erroneous operation, and as compared with a conventional apparatus, the drive cycle Tc can be shortened. By this, it becomes possible to realize high speed photosensitive material exposure, and to cause a projector with a higher pixel number to carry out display. In the image forming apparatus (exposure apparatus 400) in which gradation control is performed by on/off of exposure light, since shortening of the on/off time becomes possible, it becomes possible to realize higher gradation. As a result, it is possible to realize high speed photosensitive material exposure and to cause a projector with a higher pixel number to carry out display.

Incidentally, in the embodiments, although the structure of the spatial light modulator 200 in which the micromirror 3 as the movable part is fluctuated in the right and left directions (both directions) has been described as an example, even when the invention is applied to a spatial light modulator in a single direction and both directions in which a movable part is made of a flexible thin film (diaphragm), and the flexible thin film disposed to face the substrate 67 through a space approaches or moves away from the substrate 67 by an electrostatic force and elastic restoring force, the same effect as the above can be obtained.

Incidentally, in the embodiment, although that the invention is also applicable to the spatial light modulator in which the movable part is made of a flexible thin film has been described, it is not limited thereto, the same effect can be obtained by applying the drive system such as shutter, diffractive phase modulation, interference, and total reflection as a member for displacing a movable part which is supported capable of being elastically displaced.

What is claimed is:

1. A driving method of a spatial light modulator array comprising plural spatial light modulators of micro-electro-mechanical system,
   the plural spatial light modulators each comprising: a movable part supported to be capable of being elastically displaced and provided with a movable electrode; and a fixed electrode disposed to face the movable part,
   wherein in a case where the voltages of a direct current component are applied to the electrodes and the movable part is driven and displaced in a fixed electrode direction, an absolute value of an inter-electrode voltage between the movable electrode and the fixed electrode is decreased before the movable part reaches a final displacement position.

2. The driving method according to claim 1, wherein the absolute value is decreased while the movable part is transitioning in a direction of the fixed electrode.

3. The driving method according to claim 2, wherein the absolute value is decreased while the movable part is transitioning in a direction of the fixed electrode from the neutral position.

4. The driving method according to claim 2, wherein the absolute value is decreased by decreasing a voltage of the movable electrode.

5. The driving method according to claim 1, wherein the absolute value is increased while the movable part is transitioning in an opposite direction to the fixed electrode.

6. The driving method according to claim 1, wherein the absolute value is decreased while the movable part is transitioning in a direction of the fixed electrode, and the absolute value is increased while the movable part is transitioning in an opposite direction to the fixed electrode.

7. The driving method according to claim 1, wherein a speed of the movable part at an instant when the movable part reaches a final displacement position is made substantially zero.

8. The driving method according to claim 1, wherein the plural spatial light modulators each has a first final displacement position where the spatial light modulator is brought into a light outgoing state and a second final displacement position where the spatial light modulator is brought into a light non-outgoing state, and the inter-electrode voltage between the movable electrode and the fixed electrode is controlled so that (i) a timings when the movable parts of one of the spatial light modulators transitions from one of the first final displacement position and the second final displacement position to the other one of the first final displacement position and the second final displacement position and (ii) a timing when the movable part of another of the spatial light modulators transitions from one of the first final displacement position and the second final displacement position to the other one of the first final displacement position and the second final displacement position are substantially coincident with each other.

9. The driving method according to claim 1, wherein the plural spatial light modulators each has a first final displacement position where the spatial light modulator is brought into a light outgoing state and a second final displacement position where the spatial light modulator is brought into a light non-outgoing state, and wherein the voltage is applied if the a first displacement position of one of the plural spatial light modulators and a second displacement position of another of the plural spatial light modulators are substantially coincident with each other.

10. The driving method according to claim 1, wherein the plural spatial light modulators each has a first final displacement position where the spatial light modulator is brought into a light outgoing state and a second final displacement position where the spatial light modulator is brought into a light non-outgoing state, and wherein if one of the plural spatial light modulators and another of the plural spatial light modulators transition in same direction with respect to the fixed electrodes, the voltage is applied within a period in which the transition in the same direction occurs.

11. The driving method according to claim 1, wherein the spatial light modulators each includes a drive circuit having a memory circuit, one of the electrodes is a signal electrode to which an element displacement signal is inputted from the drive circuit, and the other is a common electrode.

12. The driving method according to claim 1, wherein the movable parts come in contact with stop members respectively disposed at final displacement positions and are stopped.

13. A spatial light modulator array comprising:

plural spatial light modulators of micro-electro-mechanical system, each of which includes a movable part supported to be capable of being elastically displaced and provided with a movable electrode, and a fixed electrode disposed to face the movable part, a control part for performing light modulation by driving the movable part based on the driving method of a spatial light modulator array according to claim 1.

14. An image forming apparatus comprising:

an optical source;

the spatial light modulator array according to claim 13;

an illumination optical system for irradiating the spatial light modulator array with light from the light source; and a projection optical system for projecting light emitted from the spatial light modulator array onto an image formation surface.

15. The driving method according to claim 1, wherein the voltages are applied by changing a voltage of the movable electrode.

16. The driving method according to claim 1, wherein the absolute value of the inter-electric voltage is changed by changing a voltage of the movable electrode.

* * * * *